(12) United States Patent
Jones et al.

(10) Patent No.: US 7,107,973 B1
(45) Date of Patent: *Sep. 19, 2006

(54) MULTIPHASE CENTRIFUGAL COMPRESSOR

(75) Inventors: Daniel W. Jones, Lenexa, KS (US); Michael A. Carlson, Stanley, KS (US); Kenneth C. Jones, Kansas City, MO (US)

(73) Assignee: Accessible Technologies, Inc., Lenexa, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/710,939

(22) Filed: Aug. 13, 2004

Related U.S. Application Data

(63) Continuation-in-part of application No. 10/710,797, filed on Aug. 3, 2004.

(51) Int. Cl.
- *F02B 33/00* (2006.01)
- *F02B 33/44* (2006.01)
- *F04B 17/00* (2006.01)
- *F01D 25/04* (2006.01)
- *F01D 25/00* (2006.01)
- *F16H 3/71* (2006.01)

(52) U.S. Cl. .......... 123/559.1; 123/562; 60/612; 60/601; 417/406; 415/119.1; 415/122.1; 475/10

(58) Field of Classification Search .......... 123/559.1, 123/562; 60/602–612; 415/119.1, 200, 415/122.1; 417/406; 475/5, 10
See application file for complete search history.

(56) References Cited

U.S. PATENT DOCUMENTS

| | | | |
|---|---|---|---|
| 1,365,663 A | 1/1921 | Covert | |
| 1,998,778 A | 4/1935 | Gregg | 123/562 |
| 2,216,731 A | 10/1940 | Birmann | |
| 2,238,889 A | 4/1941 | Kollmann | 123/562 |
| 2,283,176 A | 5/1942 | Birmann | |
| 2,296,268 A | 9/1942 | Büchi | 60/610 |
| 2,378,452 A | 6/1945 | Vincent | |
| 2,386,096 A | 10/1945 | Ehrling | |
| 2,401,677 A * | 6/1946 | Yingling | 123/65 BA |
| 2,485,503 A | 10/1949 | Misch | 415/122.1 |
| 2,585,968 A | 2/1952 | Schneider | 60/610 |
| 2,667,298 A | 1/1954 | Wells | 123/562 |
| 2,827,333 A | 3/1958 | Wallin | |
| 3,143,103 A | 8/1964 | Zuhn | |
| 3,335,563 A | 8/1967 | Kitchen | 60/610 |

(Continued)

FOREIGN PATENT DOCUMENTS

DE 19822874 A1 * 11/1999

(Continued)

*Primary Examiner*—Thai-Ba Trieu
(74) *Attorney, Agent, or Firm*—Hovey Williams LLP

(57) ABSTRACT

A multi-phase centrifugal supercharging system (10) configured for supplying compressed induction fluid to an engine (E) is disclosed. The air induction system (10) broadly includes a drive assembly (12) powered by the engine (E), a supercharging assembly (14) driven by the drive assembly (12) to compress induction fluid, and an induction fluid flow control assembly (16) in communication with the supercharging assembly (14) to control operation of the supercharging assembly (14) and cooperating therewith to deliver the compressed induction fluid to the intake manifold (IM) of the engine (E). The supercharging assembly (14) includes a pair of centrifugal superchargers (28 and 30) that are phased by the control assembly (16) between multiple operating phases, including a series phase (172) and a parallel phase (176). An alternative air system (306) is also disclosed, in use with a pneumatic conveyor (300), that phases between normal series operation and parallel, clog-displacing operation.

67 Claims, 13 Drawing Sheets

U.S. PATENT DOCUMENTS

| | | |
|---|---|---|
| 3,758,163 A | 9/1973 | Kalisiak |
| 4,059,310 A | 11/1977 | Waskiewicz et al. |
| 4,086,019 A * | 4/1978 | Poole .................. 415/122.1 |
| 4,502,283 A | 3/1985 | Wandel .................. 60/609 |
| 4,505,117 A | 3/1985 | Matsuoka ............... 60/609 |
| 4,619,590 A | 10/1986 | Johnson |
| 4,645,419 A | 2/1987 | Furuya et al. |
| 4,730,457 A | 3/1988 | Yamada et al. ............ 60/609 |
| 4,738,110 A | 4/1988 | Tateno .................. 60/610 |
| 4,903,488 A | 2/1990 | Shibata ................. 60/609 |
| 5,247,722 A | 9/1993 | Leifeld |
| 5,407,305 A | 4/1995 | Wallace |
| 5,494,381 A | 2/1996 | Heyl et al. |
| 5,564,275 A * | 10/1996 | Codan et al. ............ 60/605.2 |
| 5,771,868 A | 6/1998 | Khair ................... 60/609 |
| 5,775,851 A | 7/1998 | Waeschle et al. |
| 6,062,026 A | 5/2000 | Woollenweber et al. ..... 60/612 |
| 6,192,871 B1 | 2/2001 | Middlebrook |
| 6,293,263 B1 | 9/2001 | Middlebrook |
| 6,301,889 B1 | 10/2001 | Gladden et al. |
| 6,345,503 B1 | 2/2002 | Gladden |
| 6,418,723 B1 | 7/2002 | Gladden |
| 6,439,208 B1 | 8/2002 | Jones .................. 123/559.1 |
| 6,474,318 B1 | 11/2002 | Jones et al. ............ 123/559.1 |
| 6,478,016 B1 | 11/2002 | Roderique .............. 123/559.1 |
| 6,478,469 B1 | 11/2002 | Jones .................. 123/559.1 |
| 6,488,467 B1 * | 12/2002 | Czechowski et al. ..... 415/122.1 |
| 6,764,279 B1 | 7/2004 | Meshenky |
| 6,834,501 B1 | 12/2004 | Vrbas et al. |
| 6,935,838 B1 * | 8/2005 | Wang ................... 415/199.1 |
| 2001/0054287 A1 | 12/2001 | Hoecker et al. |
| 2004/0062644 A1 | 4/2004 | Meshenky |
| 2004/0109760 A1 | 6/2004 | Jones |

FOREIGN PATENT DOCUMENTS

| | | |
|---|---|---|
| GB | 2302914 A * | 2/1997 |
| JP | 58222919 | 12/1983 |
| JP | 61197732 A * | 9/1986 |
| JP | 62101834 | 5/1987 |
| JP | 63179126 A * | 7/1988 |
| JP | 63201319 A * | 8/1988 |
| JP | 06146908 A * | 5/1994 |

* cited by examiner

MULTIPHASE CENTRIFUGAL COMPRESSOR

RELATED APPLICATIONS

This application is a continuation-in-part of application Ser. No. 10/710,797, filed Aug. 3, 2004, which is hereby incorporated by reference herein.

BACKGROUND OF THE INVENTION

1. Field of the Invention

The present invention relates generally to air induction systems for providing increased airflow to the intake of an engine or for powering industrial conveyance systems. More particularly, the present invention concerns a multi-phase centrifugal supercharging air induction system having a pair of superchargers that phase between serial and parallel operation to supply constant target boost to the intake over the entire rev range of the engine as well as a multi-phase centrifugal compressor for spiking the air pressure in a conveyance system.

2. Discussion of Prior Art

Compressors that increase air flow to an engine (thereby increasing the power generated thereby) are known in the art and generally include positive displacement blowers, turbochargers, and centrifugal superchargers. In addition to increased air flow, all of these compressors desirably supply pressurized air to the engine—i.e., air under increased pressure relative to the normal atmospheric pressure of ambient air at the system's inlet. The pressurized air in combination with the increased air flow is commonly referred to as "boost." Positive displacement ("PD") blowers typically utilize a pair of intermeshing, counter-rotating figure-eight shaped impellers, or a screw-type impeller, driven off of the crankshaft to "push" air into the intake manifold thereby compressing the air. PD blowers supply fairly constant flow to the engine over varying pressure conditions and engine rpm. Turbochargers typically utilize an impeller driven by a turbine that is powered by the exhaust output of the engine to compress air for the engine. Turbochargers supply fairly constant boost to the engine only through the powerband—i.e., the engine is operating at fifty percent of its rev range or higher, a.k.a. "redline." Centrifugal superchargers typically utilize an impeller powered by the engine's crankshaft to compress air for the engine. Centrifugal superchargers supply boost to the engine generally defined by a somewhat linear boost response curve wherein the boost supplied varies with engine rpm.

All of these prior art compressors are problematic and suffer from undesirable limitations. For example, PD blowers are inefficient, requiring an undesirable amount of engine horsepower to drive the impellers thereby effectively reducing any supplied boost, and are part-intensive, both of which increase the risks of catastrophic failure, such as through heat degradation. Additionally, the inefficiency of PD blowers worsens at higher engine rpms, compounding their limitations. Turbochargers do not have the horsepower requirements inherent in PD blowers; however, turbochargers suffer from low-end boost problems wherein the flow of exhaust at lower engine rpm is not sufficient to power the turbine as desired. Additionally, because turbochargers are not directly driven, they suffer from undesirable "lag" problems. Furthermore, both PD blowers and turbochargers are adiabatically inefficient relative to centrifugal superchargers in terms of boost created relative to flow. Prior art centrifugal superchargers have desirably less horsepower requirements than PD blowers and do not suffer from the lag problems of turbochargers. However, given their linear boost curve, these centrifugal superchargers either suffer from low end boost problems or high end boost problems. That is to say, if optimal boost is provided at higher engine rpms, the boost provided at lower engine rpms is significantly less than optimal. Conversely, if the typical centrifugal supercharger is set up to provide optimal boost at lower engine rpms, it will provide more boost than the engine can handle at higher engine rpms.

In powered vehicle applications, such as automotive applications, the problems and limitations detailed above are further compounded by the variable nature of the internal combustion engine. An internal combustion engine, when off idle, operates at an rpm that varies over a rev range. As the rpm varies, so does the normal flow of induction fluid through the engine, as well as the pressure of the induction fluid at the intake manifold. Additionally, as the rpm of the crankshaft varies, so does the rotational speed of any compressor impeller directly driven thereby. Furthermore, as the powered vehicle changes altitude, the pressure of ambient air at the forced air system's inlet varies (relative to normal atmospheric pressure at sea level, or 14.7 psi). However, the ideal target boost for automotive compressor applications remains constant (e.g., 10–12 psi of boost) over the entire rev range despite the varying conditions.

There have been prior art efforts to solve one or more of the above identified problems by using two compressors in combination to supply forced induction fluid to an engine. These prior art efforts fall into two general categories. First, it is known in the art to augment a turbocharger with a second compressor (either another turbocharger or a supercharger). In these prior art augmented turbocharger systems, the second compressor is only used below the powerband, typically to reduce lag problems, and only the turbocharger is used throughout the powerband. These augmented turbocharger systems utilize the second compressor only in series, or only in parallel (but typically dump the induction fluid compressed by the turbocharger below the powerband), and clutch the second compressor throughout the powerband. Secondly, it is known in the art to utilize two superchargers only in series, or only in parallel, to provide induction fluid to an engine. These dual supercharger systems are limited to constant speed engines, such as an airplane engine, and all utilize a variable speed drive, such as a clutch, to bypass one or both superchargers when the airplane is operating at lower altitudes.

These prior art dual compressor systems are problematic and subject to several undesirable limitations. For example, all of these prior art systems require a variable speed drive for at least one of the compressors. These variable speed drives are undesirable in that they are part intensive, have inherent mechanical limitations, and require wear-intensive parts subject to failure brought on by heat degradation. Additionally, the augmented turbocharger systems require undesirable part intensive valving in addition to at least one dump gate and are still limited by most of the problems inherent in turbochargers, such as relatively constant flow limitations. The dual supercharger systems are further limited to relatively constant speed engine applications and are not well suited for automotive applications. Accordingly, there is a need for an improved forced air induction system that is both operable to supply substantially constant target boost over the entire rev range of a variable rpm engine that does not suffer from the problems and limitations detailed above.

It is also known in the art to utilize a compressor to power an industrial conveyance system, such as a pneumatic conveyor. Conventional pneumatic conveyors utilize a forced airstream directed through a network of tubing that carries materials, such as particulate entrained within the airstream, from one location to another, such as through one or more processing stations in a plant. These prior art systems have utilized a PD blower, such as one powered by an electric motor, to provide the forced airstream. These prior art systems are problematic and subject to several undesirable limitations. For example, the tubing is susceptible to frequent clogging in the line, which in turn causes pressure increases upstream of the clog. PD pumps are well suited to maintain the air flow as the pressure conditions in the line increase. However, a PD pump is not well suited to ramp up the air flow to "push" the clog through the line or break it up. Additionally, as indicated above, PD pumps have greater energy needs to power them and are undesirably inefficient in terms of unit of flow created relative to power input. These inefficiencies are exacerbated in pneumatic conveyor applications as the compressor is typically running continuously over extended periods of operation.

SUMMARY OF THE INVENTION

The present invention provides a multi-phase centrifugal supercharging air induction system that does not suffer from the problems and limitations of the prior art systems detailed above. The inventive system includes a pair of centrifugal superchargers that phase between serial and parallel operation to supply constant target boost to the intake over the entire rev range of the engine. The inventive system enables the desirable advantages of a variable flow compressor without the need for an undesirable variable speed drive. The inventive system further enables a relatively simple, part-conservative construction that is not limited to relatively constant speed engines. For example, the inventive system is particularly well suited for supplying compressed induction fluid to the intake of an internal combustion engine operating over a varying rpm rev range, such as the engine powering a land vehicle. Additionally, the inventive system can be configured to power a pneumatic conveyor system thereby enabling the use of centrifugal compressing that can quickly ramp up flow to purge a downstream clog.

A first aspect of the present invention concerns a multiphase compressing assembly for supplying compressed air to a system. The assembly broadly includes a first compressor drivingly connectable to power source and operable to compress air for the system, a second compressor drivingly connectable to the power source and operable to compress air for the system, and an fluid flow control assembly fluidly intercommunicating the compressors so that the compressors cooperatively provide compressed air to the system in a number of operating phases. The first compressor includes a first inlet, a spaced first outlet, and a first impeller fluidly between the first inlet and first outlet to compress air. The second compressor includes a second inlet, a spaced second outlet, and a second impeller fluidly between the second inlet and second outlet to compress air. The operating phases include a first phase in which at least some compressed air from the first outlet is supplied to the second inlet and a second phase in which at least some compressed air from the first and second outlets is supplied to the system without passing through the other compressor.

A second aspect of the present invention concerns a method of supplying compressed air to a system. The method broadly includes the steps of driving a first compressor off of a power source to compress air, driving a second compressor off of the power source to compress air, operating the compressors at least partially in series so that at least some air that is compressed by the first compressor is further compressed by the second compressor and then supplied to the system, and switching operation of the compressors to at least partially in parallel in response to a predetermined condition so that at least a portion of air is compressed by the first compressor and at least another portion of air is compressed by the second compressor and the at least a portion and at least another portion of compressed air are supplied to the system without passing through the other compressor.

A third aspect of the present invention concerns an improved air system in a pneumatic conveyor including tubing and a power source. The improved air system broadly includes a first centrifugal compressor drivingly connected to the power source for compressing air for the tubing, a second centrifugal compressor drivingly connected to the power source for compressing air for the tubing, and a fluid flow control assembly fluidly intercommunicating the compressors so that the compressors cooperatively provide compressed air to the tubing in a number of operating phases. The first compressor includes a first inlet, a spaced first outlet, and a first impeller fluidly between the first inlet and first outlet to compress air. The second compressor includes a second inlet, a spaced second outlet, and a second impeller fluidly between the second inlet and second outlet to compress air. The operating phases include a first phase in which at least some compressed air from the first outlet is supplied to the second inlet and a second phase in which at least some compressed air from the first and second outlets is supplied to the tubing without passing through the other compressor.

In a preferred embodiment of the multi-phase centrifugal compressing air system, the centrifugal compressors are housed in a common case and share some common transmission components that are driven by a drive assembly that cooperates to rotate the compressors' impellers continuously with operation of the power source at a substantially constant ratio relative to the operation of the power source. In this preferred embodiment, the fluid flow control assembly is configured so that in all operating phases both compressors compress at least some air for the conveyor whenever the power source is operating. The preferred flow control assembly includes a valve disposed between the compressors that controls phasing of the compressors between serial and parallel operation based on pressure conditions in the conveyor so that the compressors normally operate in series and switch to parallel operation (either automatically or manually) when pressure in the conveyor becomes elevated, such as by a downstream clog.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein:

FIG. 9 is a greatly enlarged perspective view of the outlet gate valve of the first supercharger of the supercharging assembly of the induction system illustrated in FIGS. 1–8 shown with the outlet passageway (in phantom) and the serial passageway (in section) with portions broken away and with arrows indicating the flow of induction fluid there through;

Figure 13:
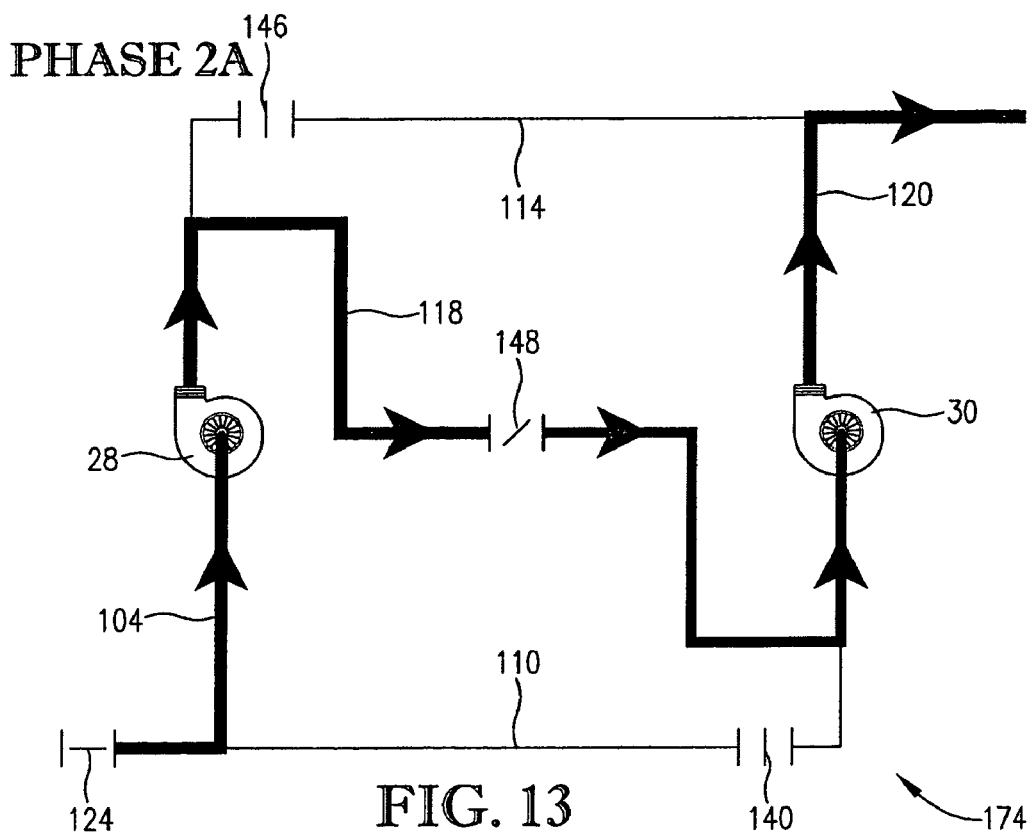
Figure 14:
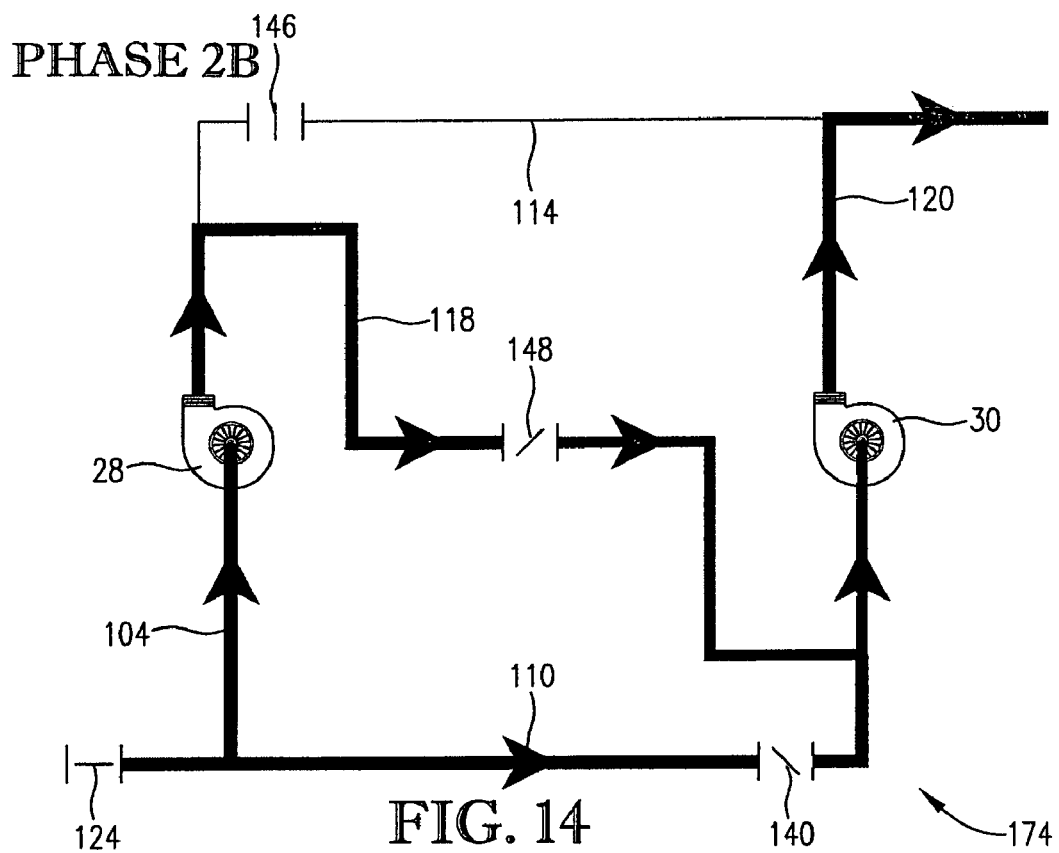
Figure 15:
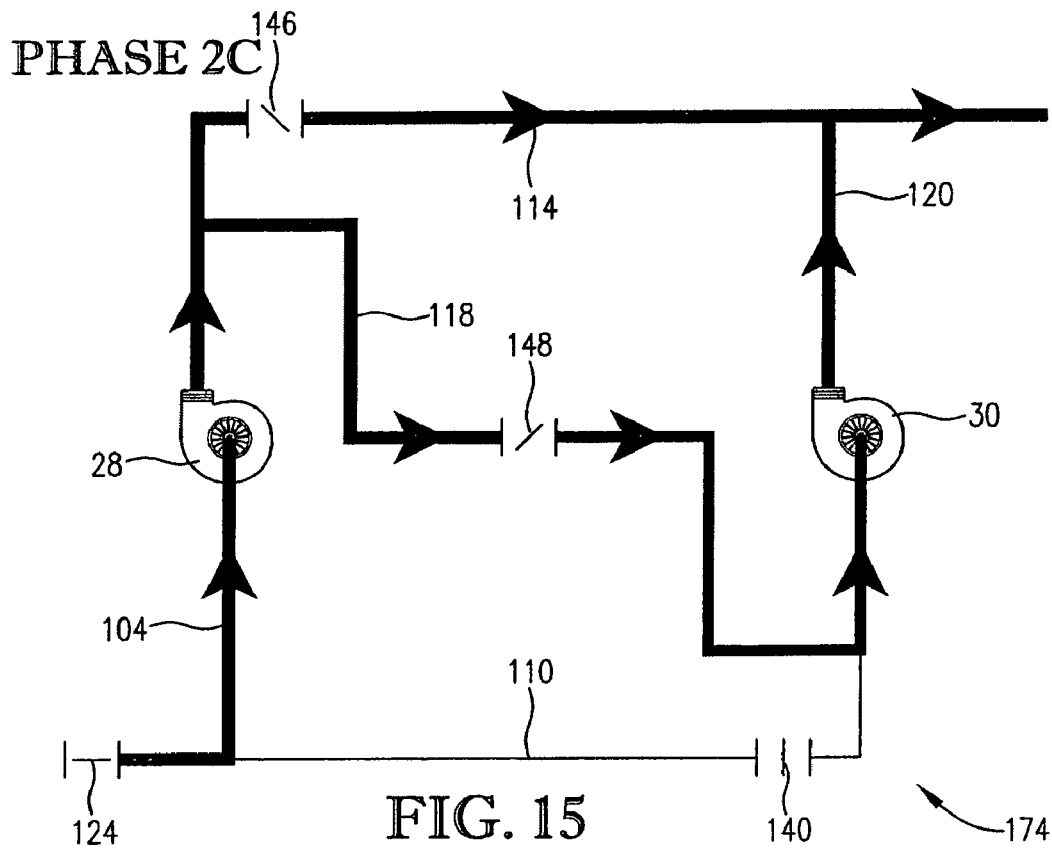
Figure 16:
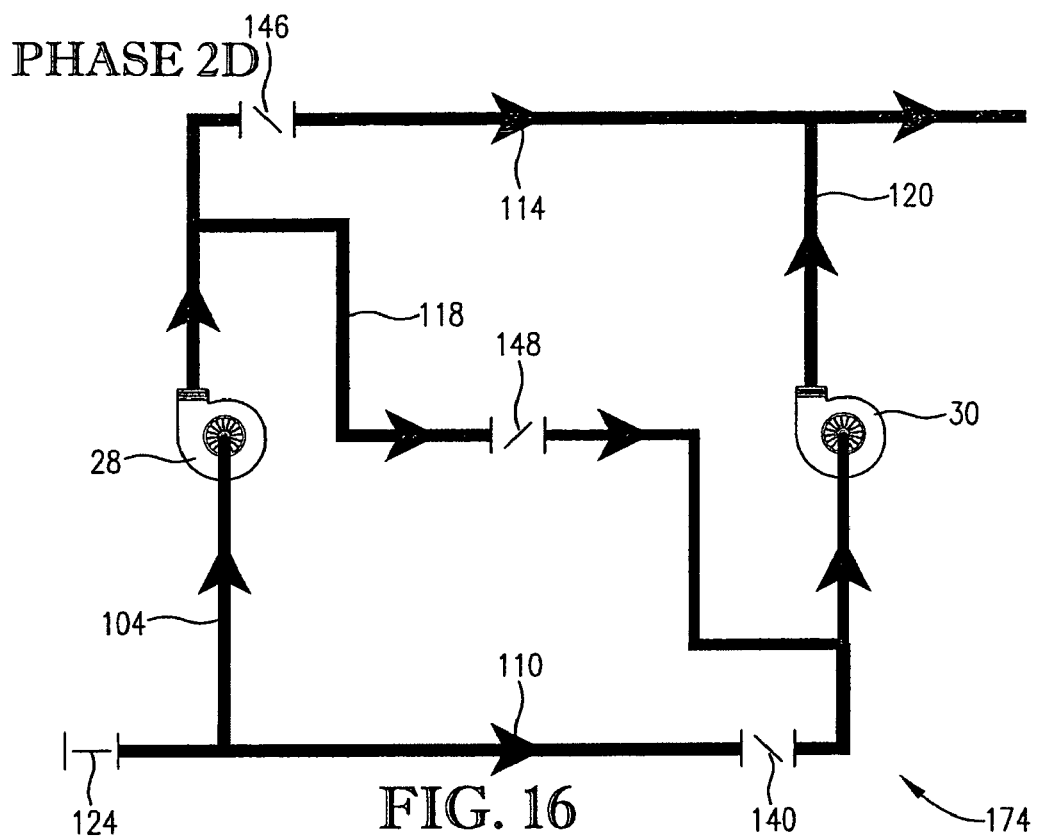
Figure 17:
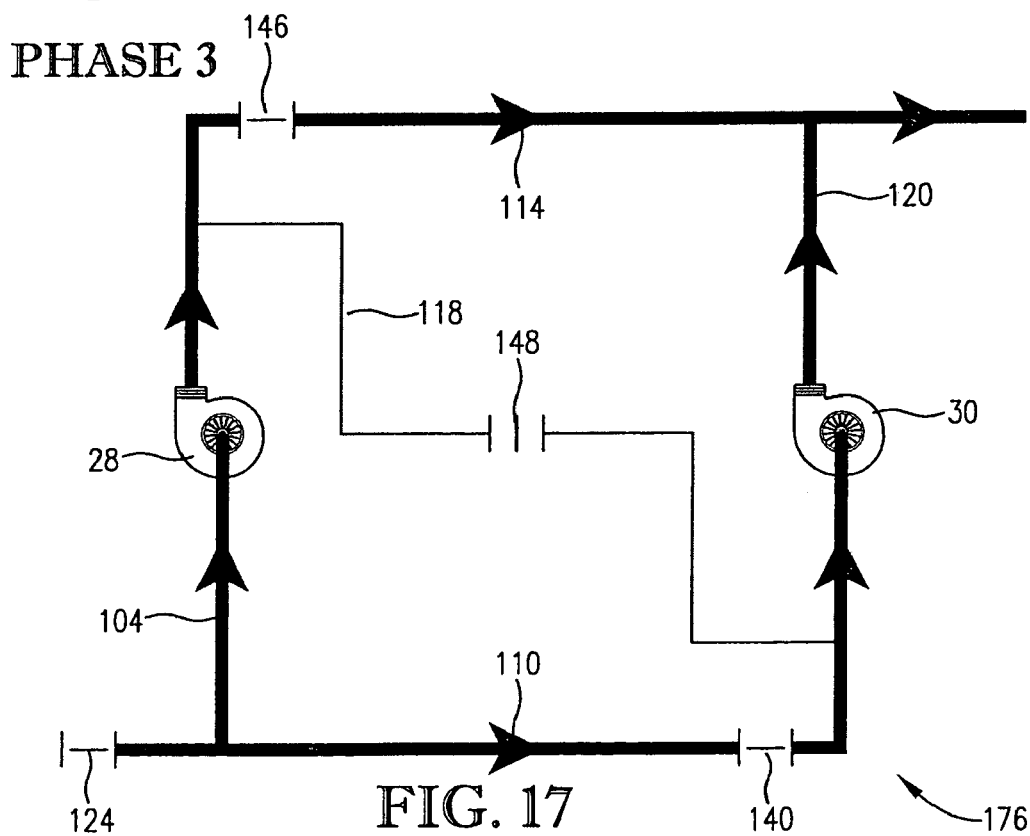
Figure 18:
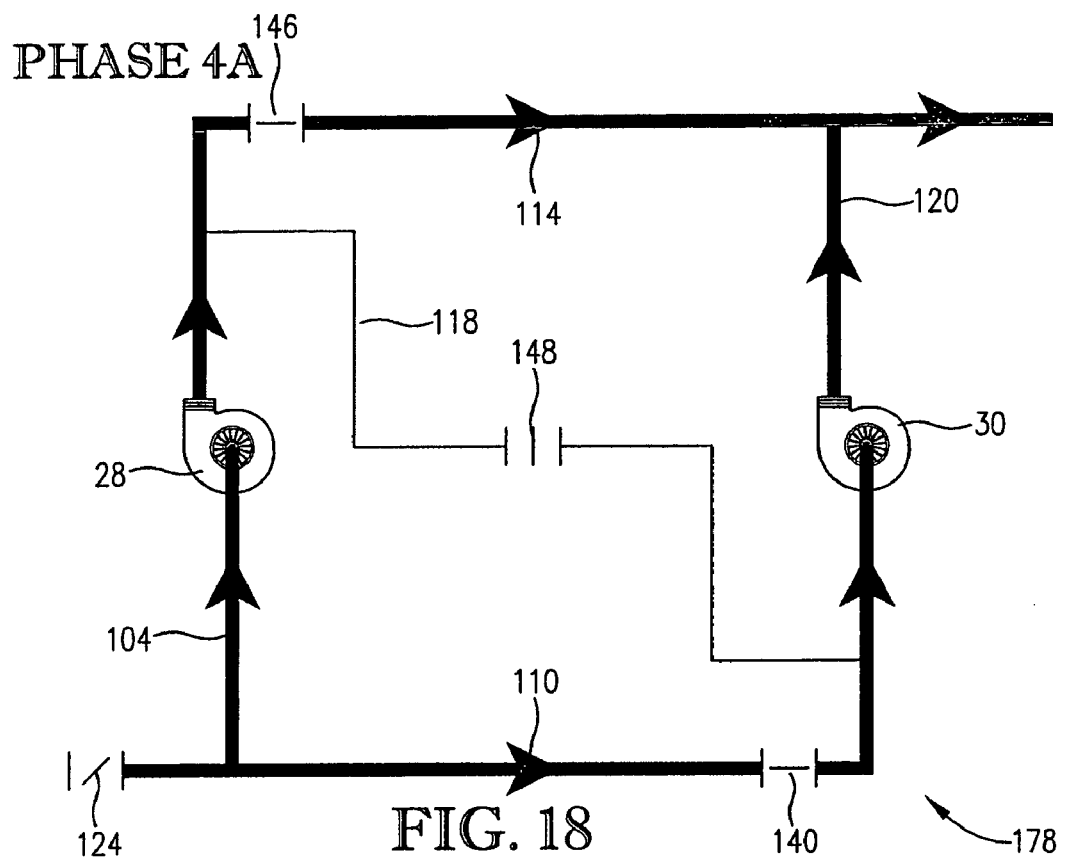
Figure 19:
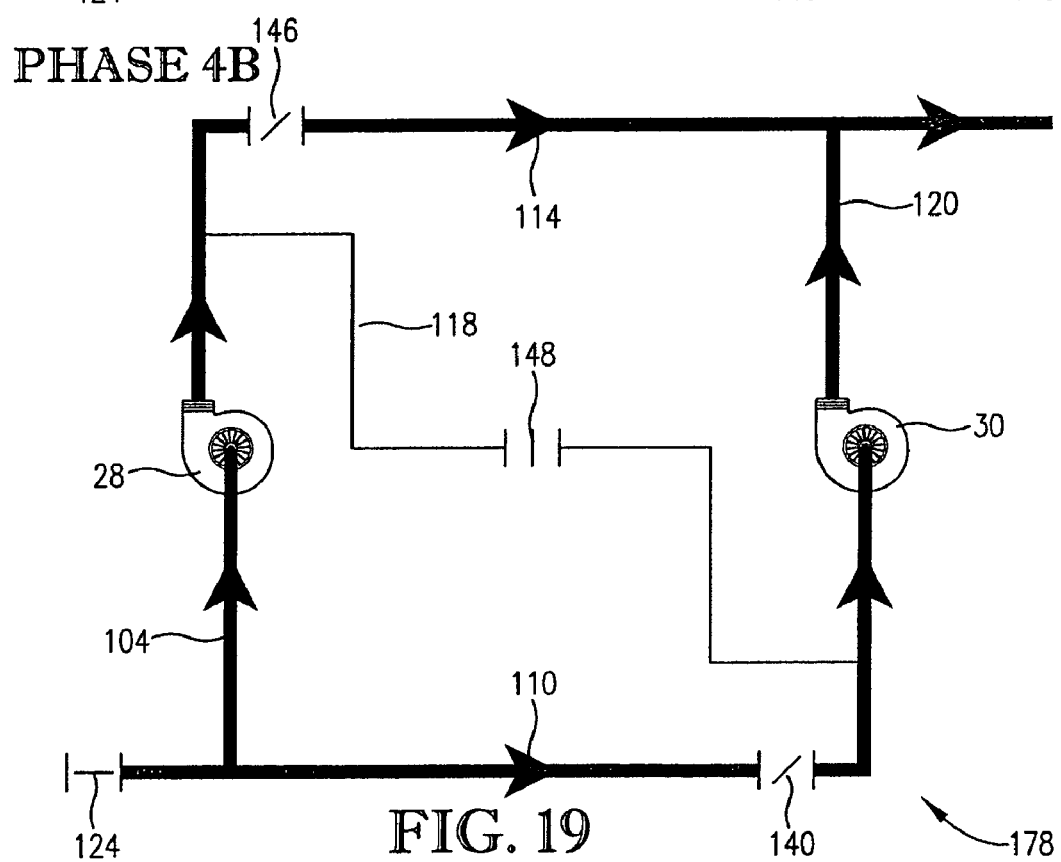
Figure 20:
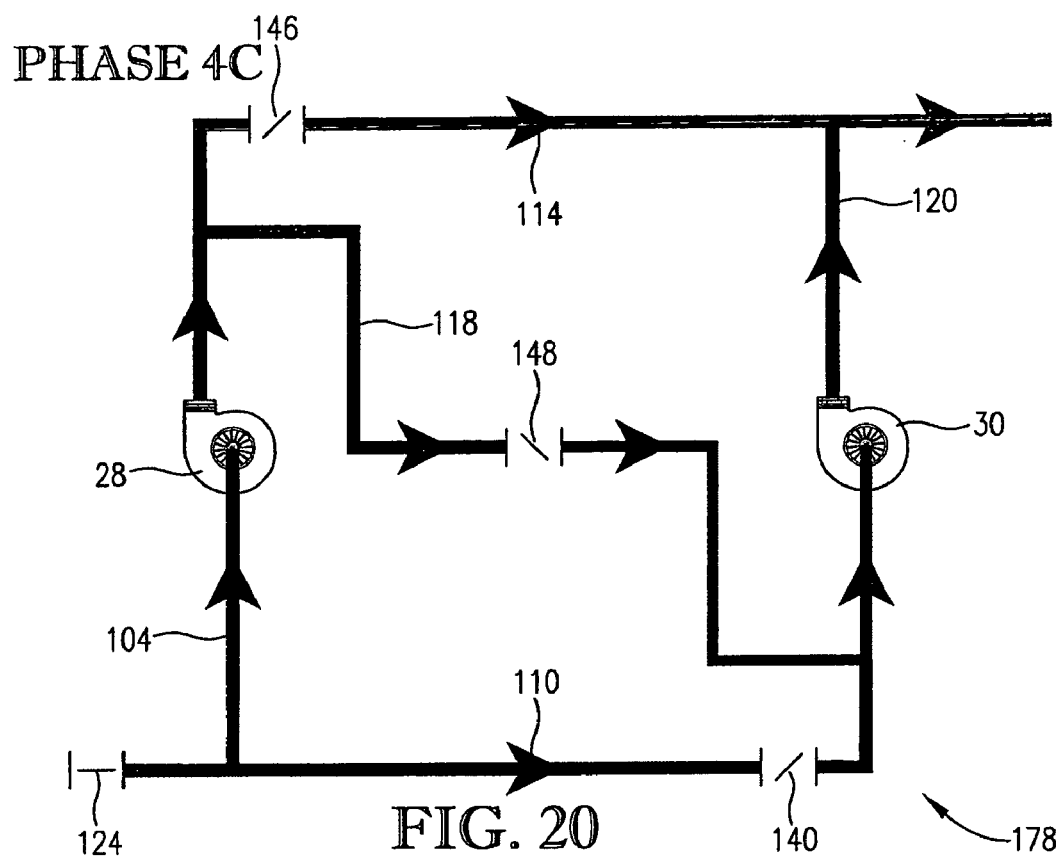
Figure 21:
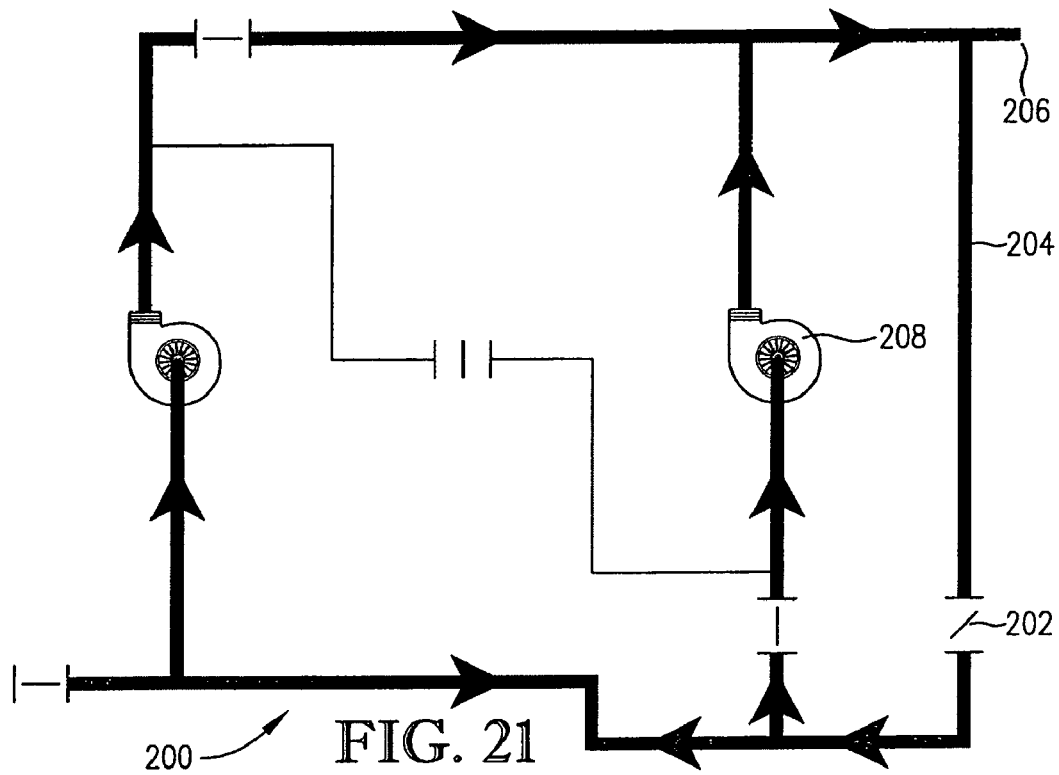
Figure 22:
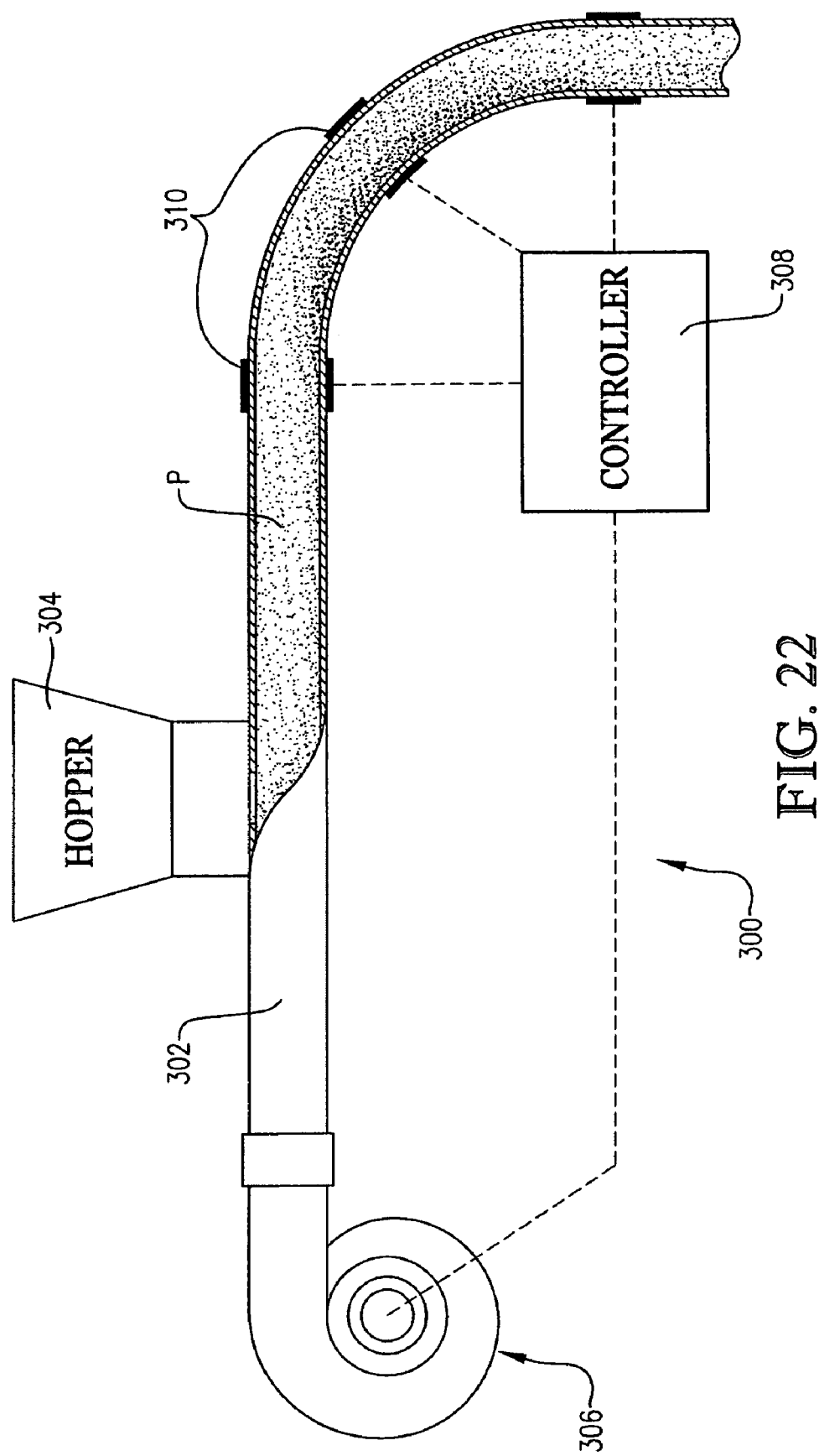

FIG. 13 is a schematic diagram depicting transitional operation of the induction system illustrated in FIGS. 1–9 phasing from serial to parallel operation in operating phase two with the inlet valve in the fully open position, both gate valves in the fully closed position, and the control valve in a partially open position (the control valve is beginning to close) with the darkened lines and arrows indicating the flow of induction fluid through the system;

FIG. 14 is a schematic diagram similar to FIG. 13 depicting transitional operation of the system in operating phase two but wherein the inlet gate valve for the second supercharger is partially open;

FIG. 15 is a schematic diagram similar to FIG. 14 depicting transitional operation of the system in operating phase two but wherein the inlet gate valve is closed and the outlet gate valve for the first supercharger is partially open;

FIG. 16 is a schematic diagram similar to FIG. 15 depicting transitional operation of the system in operating phase two but wherein both the inlet and outlet gate valves are partially open;

FIG. 17 is a schematic diagram depicting parallel operation of the induction system illustrated in FIGS. 1–9 in operating phase three with the inlet and both gate valves in the fully open position and the control valve in the fully closed position with the darkened lines and arrows indicating the flow of induction fluid through the system;

FIG. 18 is a schematic diagram depicting throttling operation of the induction system illustrated in FIGS. 1–9 in operating phase four with the inlet valve in the partially open position, both gate valves in the fully open position, and the control valve in the fully closed position with the darkened lines and arrows indicating the flow of induction fluid through the system;

FIG. 19 is a schematic diagram similar to FIG. 18 depicting throttling operation of the system in operating phase four but wherein the inlet valve is fully open and both the inlet and outlet gate valves are only partially open;

FIG. 20 is a schematic diagram similar to FIG. 19 depicting throttling operation of the system in operating phase four but wherein the control valve is now partially open;

FIG. 21 is a schematic diagram depicting throttling operation of a multi-phase centrifugal supercharging air induction system constructed in accordance with a preferred alternative embodiment of the present invention and having a recirculation valve wherein the inlet valve and both gate valves are in the fully open position, the control valve is in the fully closed position, and the recirculation valve is in the partially open position with the darkened lines and arrows indicating the flow of induction fluid through the system; and FIG. 22 is a schematic diagram of a pneumatic conveyor including a multi-phase centrifugal compressing air system constructed in accordance with a preferred alternative embodiment of the present invention.

DETAILED DESCRIPTION OF THE PREFERRED EMBODIMENTS

Figure 1:
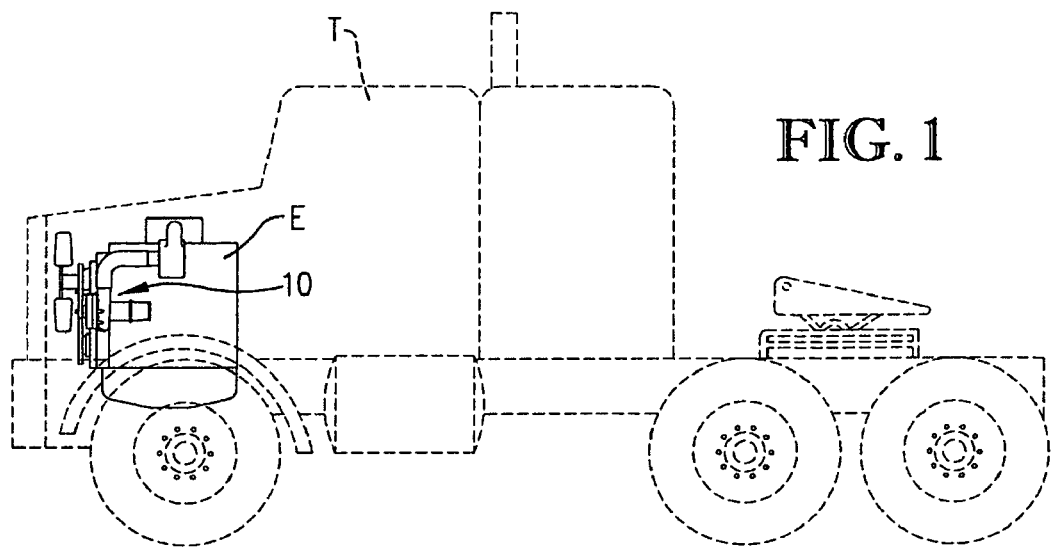
FIG. 1 is a side elevational view of a land vehicle (shown in phantom) powered by an internal combustion engine and including a multi-phase centrifugal supercharging air induction system constructed in accordance with a preferred embodiment of the present invention and configured for supplying compressed induction fluid to the intake manifold of the engine.
Figure 2:
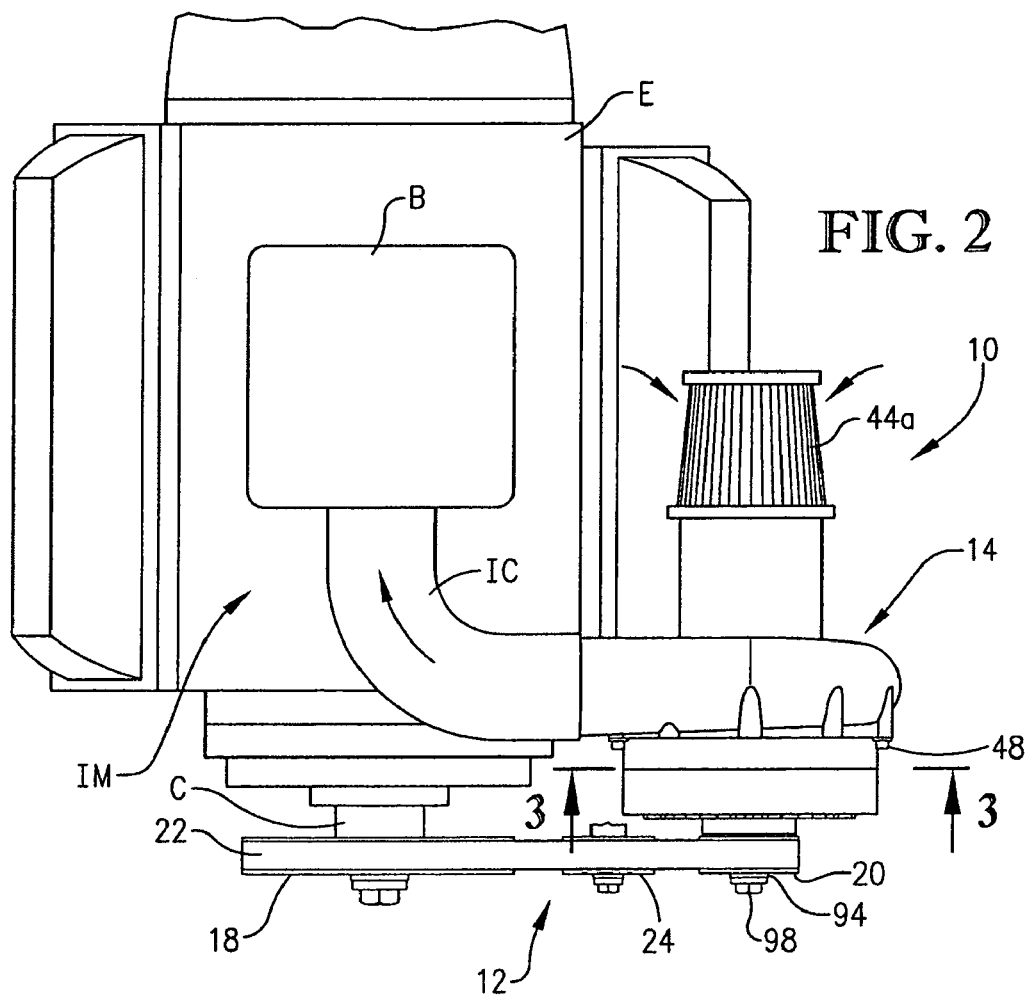
FIG. 2 is a plan view of the engine and air induction system illustrated in FIG. 1 with arrows indicating the flow of induction fluid into and through the system.
Figure 3:
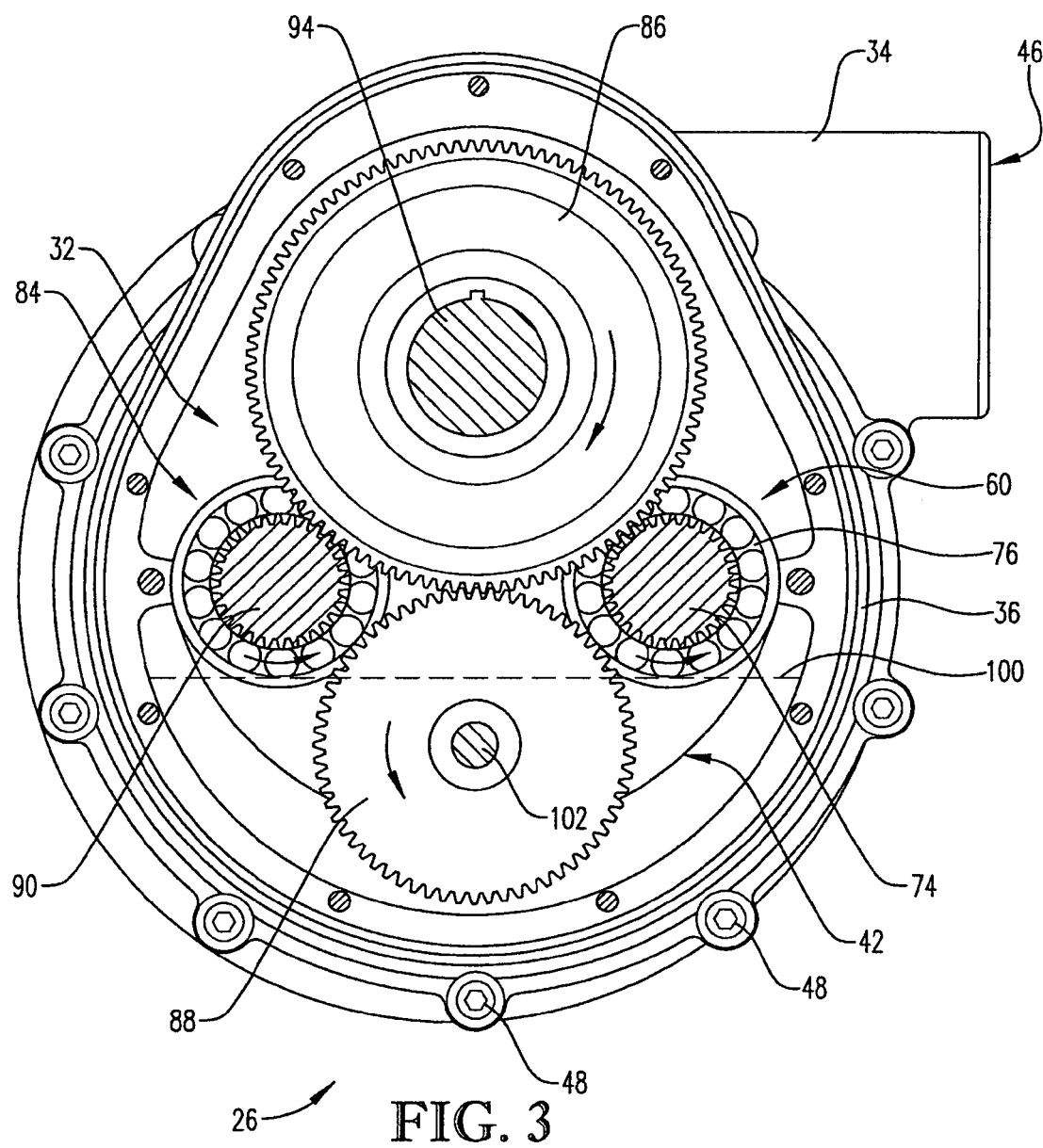
FIG. 3 is a sectional view of the supercharging assembly of the induction system taken substantially along 3—3 of FIG. 2 illustrating the components within the transmission chamber with arrows showing the direction of rotation of the common transmission drive gear and slinger, as well as each of the pinion gears for the dual superchargers.
Figures 4, 5:
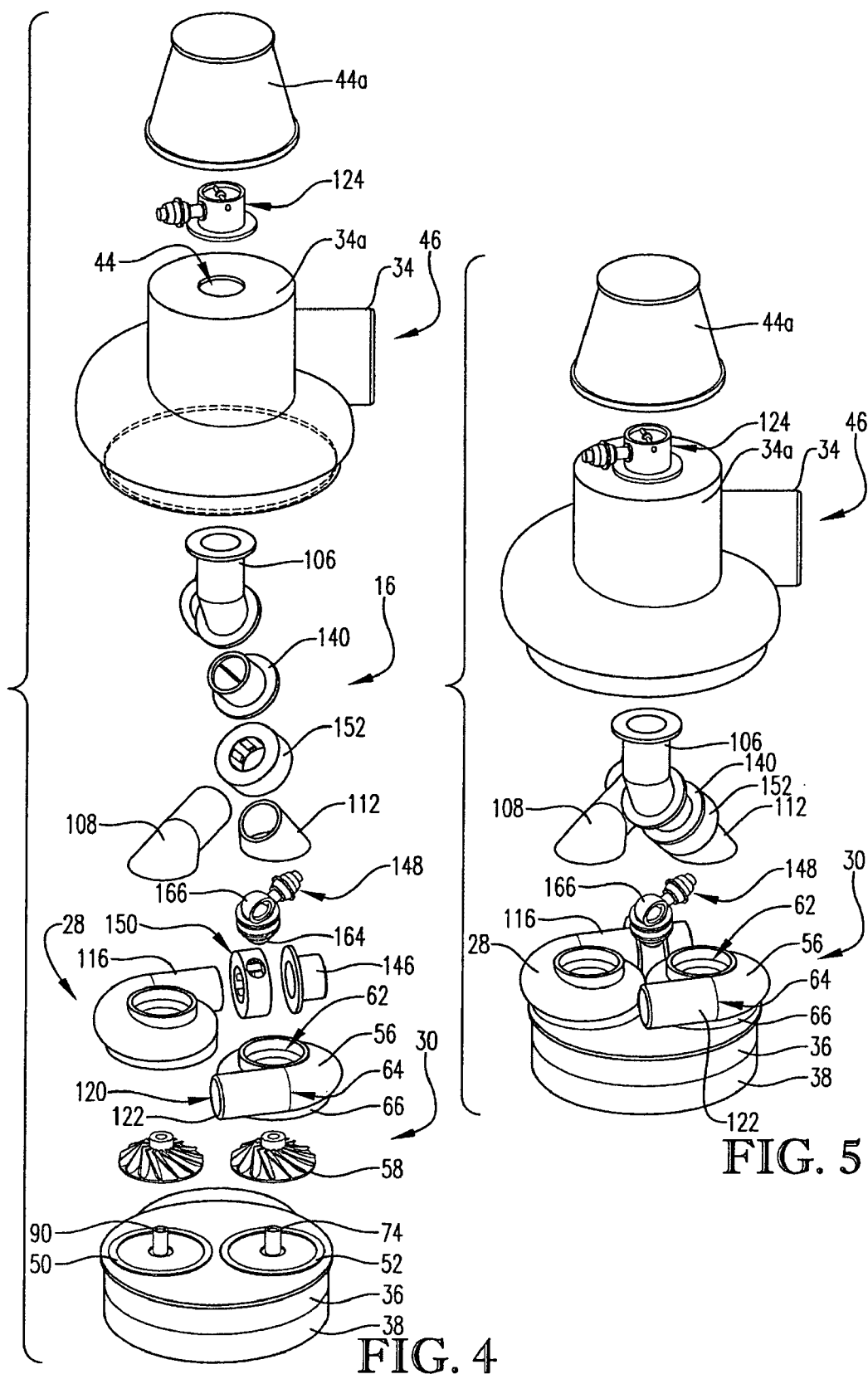
FIG. 4 is an exploded assembly view of the supercharging assembly, as well as the components of the induction fluid flow control assembly housed therein, of the induction system illustrated in FIGS. 1–3.
FIG. 5 is an exploded assembly view similar to FIG. 4 showing some of the components of the supercharging assembly and flow control assembly assembled.

FIG. 1 illustrates a multi-phase centrifugal supercharging system 10 constructed in accordance with the principles of a preferred embodiment of the present invention and configured for supplying compressed induction fluid to an engine E. The illustrated engine E is used to power a land vehicle, such as the illustrated truck T. The principles of the present invention are particularly well suited to handle the forced air induction problems presented by powered land vehicles operating at varying engine rpms and varying altitudes. However, some aspects of the present invention are not limited to land vehicles and equally apply to virtually any powered vehicle, even those operating at generally constant engine rpms, such as airplanes or marine craft, as well as to other non-vehicle applications, such as industrial engines and/or industrial conveyor systems. As shown in FIG. 2, the illustrated engine E is an internal combustion engine that burns diesel fuel and includes a rotating crankshaft C and an intake manifold IM. When the engine E is off idle, the crankshaft C operates at variable rpm over a rev range. The engine E receives induction fluid through the intake manifold IM and in the illustrated engine E, the manifold IM includes a plenum box B in communication with an intake conduit IC. However, the engine E could be variously configured so long as it utilizes induction fluid. As shown in FIGS. 1, 2, and 4, the illustrated multi-phase centrifugal supercharging air induction system 10 broadly includes a drive assembly 12 powered by the engine E, a supercharging assembly 14 driven by the drive assembly 12 to compress induction fluid, and an induction fluid flow control assembly 16 in communication with the supercharging assembly 14 to control operation of the supercharging assembly 14 and cooperating therewith to deliver the compressed induction fluid to the intake manifold IM of the engine E.

As indicated, the drive assembly 12 powers the supercharging assembly 14 off of the engine E. The illustrated drive assembly 12 is a mechanical direct drive that operates the supercharging assembly 14 continuously with rotation of the crankshaft C. Additionally, the illustrated drive assembly 12 operates the supercharging assembly 14 at a substantially constant ratio relative to the rotation of the crankshaft C. In more detail, and turning to FIG. 2, the illustrated drive assembly 12 is a belt drive and includes a drive sheave 18 fixed to the crankshaft C, a driven sheave 20, a belt 22 entraining the sheaves 18 and 20, and an idler sheave 24 suitably tensioning the belt 22. As further described in detail below, the driven sheave 20 rotatably communicates with the supercharging assembly 14 so that rotation of the crankshaft C effects operation of the supercharging assembly 14. In this manner, and as indicated above, the drive assembly 12 is not variable speed drive—that is, it does not include a clutch or a speed varying transmission or the like. However, the drive could be variously configured, for example, the drive could be chain driven. Additionally, the drive could utilize a tensioning mechanism that eliminates the idler sheave 24. One such suitable mechanism is disclosed in Applicant's copending Application for U.S. patent Ser. No. 10/860,568, filed Jun. 1, 2004, entitled ECCENTRIC PULLEY SHAFT, which is hereby incorporated by reference herein. Moreover, for some aspects of the present invention, the drive need not be mechanical, or a direct drive, or transfer power at a constant ratio to the crankshaft rotation, for example, for these aspects the drive could be a variable speed drive.

The supercharging assembly 14 is driven by the drive assembly 12 to compress induction fluid for the engine E. The illustrated supercharging assembly 14 broadly includes a case 26, a pair of centrifugal superchargers 28 and 30 housed within the case 26, and a transmission subassembly 32 drivingly connecting the superchargers 28,30 to the drive assembly 12 (see FIG. 8). Turning to FIGS. 2–8, the illustrated case 26 houses and/or supports the other components of the supercharging assembly 14 as well as the induction fluid flow control assembly 16. In more detail, the preferred case 26 generally includes three main case sections 34, 36, and 38 that cooperate to define a compressor chamber 40 and a transmission chamber 42. The case 26 is similar in many respects to cases utilized on Applicant's commercial superchargers, available in a variety of models under the designation ProCharger,® as well as the case described in detail in Applicant's Application for U.S. patent Ser. No. 10/641,619, filed Aug. 14, 2003, entitled CENTRIFUGAL COMPRESSOR WITH IMPROVED LUBRICATION SYSTEM FOR GEAR-TYPE TRANSMISSION ("Jones '619 Application"), which is hereby incorporated by reference herein.

However, it will be appreciated that the illustrated section 34, although volute shaped for aesthetic purposes, primarily serves as a hood to house components (including components that do compress air) in the compression chamber 40 defined therein rather than as an air compressing-volute.

The hood 34 presents a centralized inlet opening 44 (see FIG. 4) through which fluid enters the case 26. A filter 44a (see FIG. 2) is preferably provided around the inlet opening 44, as shown, or somewhere upstream from the opening 44. Although not illustrated, the inlet opening 44 may alternatively communicate with a forwardly open conduit (not shown) that extends toward the front of the powered vehicle T, such that air flow to the supercharging assembly 14 is facilitated when the vehicle T is moving in a forward direction. The hood 34 further presents an outlet opening 46 communicating with the intake manifold IM via the conduit IC (see FIG. 2). As will subsequently be described in detail, flow of induction fluid through the compression chamber 40 between the inlet and outlet openings 44,46 is directed and controlled by the flow control assembly 16. In this regard, in order to enable sufficient clearance for the components of the flow control assembly 16 housed therein, the illustrated hood 34 is somewhat enlarged relative to the case illustrated in the Jones '619 Application previously incorporated herein and includes a protracted hat section 34a, but is otherwise shaped to resemble Applicant's prior cases.

The hood 34 is fastened to the middle case section 36 so the sections 34,36 cooperate to define the compression chamber 40 therebetween. Similar to the case illustrated in the Jones '619 Application, each of the sections 34 and 36 are complementally configured for coupling to one another, such as with threaded screw-type fasteners 48 (see FIGS. 2 and 3). However, it will further be appreciated that such assemblage is well known in the art and therefore this structure is not shown in the somewhat schematic views of the case 26 in FIGS. 4–8. The case section 36 is configured to fluidly isolate the compression and transmission chambers 40,42 and to support the superchargers 28,30 in the compression chamber 40. In this regard, the upper surface of the case section 36 faces the compression chamber 40 and includes a pair of annular rings 50 and 52 formed therein, each being configured to receive one of the superchargers 28,30 (see FIGS. 4 and 8). For purposes that will subsequently be described, the case section 36 further includes a pair of impeller shaft openings (with only the right-hand opening 54 being shown in FIG. 8) concentrically positioned in a corresponding ring 50,52 and each extending through the case section 36 from the compressor chamber 40 to the transmission chamber 42. Although not shown in the quasi schematic FIG. 8, similar to the middle case section detailed in the Jones '619 Application, the opposing face of the case section 36 is configured to support various components of the transmission subassembly 32, such as having bearing sockets and seal recesses formed therein.

The case section 36 is coupled to the case section 38 to define the transmission chamber 42 that houses and supports the components of the transmission subassembly 32. As further detailed below, the transmission subassembly 32 is lubricated by a self-dedicated lubrication system and therefore the transmission chamber 42 is sealed to thereby retain lubrication fluid therein. Although not shown, in a manner well known in the art, the case section 38 includes an input shaft opening formed there through. For purposes that will subsequently be described, the input shaft opening is offset from each of the impeller shaft openings, such as opening 54, but generally centered therebetween. Although not shown in FIG. 8, similar to the middle case section 36, the inner face of the case section 38 is configured to support various components of the transmission subassembly 32, such as having bearing sockets and seal recesses formed therein.

The case 26 could be variously alternatively configured. For example, the hood 34 could include integrally formed components of the flow control assembly 16, such as tubing operable to direct induction fluid through the superchargers 28,30 between the inlet and outlet openings 44,46. In this regard, the hood 34 could also include integrally formed components of the superchargers 28,30, such as volutes in which induction fluid is compressed by their impellers. Furthermore, it is within the ambit of the present invention to eliminate the case for housing the superchargers and flow control assembly and simply use a pair of stand alone superchargers intercommunicated by a flow control assembly. However, it is preferred that a self-contained lubrication system is utilized to lubricate the superchargers' transmission components, but such a system could utilize a pair of self-contained systems, one for each of the stand alone superchargers.

The illustrated centrifugal superchargers 28,30 are housed within the case 26 and each is configured to compress induction fluid for the engine E. As will subsequently be described in detail, the superchargers 28,30 are intercommunicated by the induction fluid flow control assembly 16 so as to cooperate to provide induction fluid to the engine E in a number of different operating phases. Except as indicated below, the superchargers 28,30 are similar in configuration; therefore, only the supercharger 30 will be described in detail with the understanding that the supercharger 28 is similarly constructed. The supercharger 30 broadly includes a volute 56, a rotatable impeller 58 housed within the volute 56, and a transmission 60 rotatably intercommunicating the impeller 58 with the transmission subassembly 32 (see FIG. 4). It will be appreciated that the supercharger 30 is similar in many respects to Applicant's commercial superchargers, available in a variety of models under the designation ProCharger,® as well as the supercharger described in detail in the Jones '619 Application.

In more detail, and turning to FIGS. 3–8, the volute 56 includes an inlet 62 and an outlet 64 (see FIGS. 4 and 5). In the usual manner, incoming induction fluid enters the volute 56 through the inlet 62, is pressurized and accelerated within the volute 56, and is discharged through the outlet 64. The volute 56 extends circumferentially around the central inlet 62 defining a progressively increasing diameter. In this regard, induction fluid flows axially through the inlet 62, is propelled generally radially against the volute walls, and then is directed along a generally circular path to the outlet 64. The bottom of the volute 56 includes an annular lip 66 configured to generally seal around the annular ring 52 on the middle case section 36. The volute is secured to the middle case section 36 in any suitable manner, such as with fasteners similar to the fasteners 48. When coupled to the middle case section 36, the volute 56 is configured to snugly house the impeller 58, enabling rotation thereof relative to the case section 36. In this regard, while the illustrated volute 56 is preferably formed of a suitable, durable material, such as polished cast steel, it is within the ambit of the present invention to utilize relatively softer materials on the inside of the volute 56, for example as an insert, particularly surrounding the impeller 58, to desirably reduce the tolerances between the inside of the volute 56 and the moving impeller 58 housed therein while reducing the risk of catastrophic failure by unintended impeller contact with the volute 56. One suitable preferred soft material insert is disclosed in copending application for U.S. patent Ser. No. 10/349,411, filed Jan. 22, 2003, entitled A METHOD AND APPARATUS FOR INCREASING THE ADIABATIC EFFICIENCY OF A CENTRIFUGAL SUPERCHARGER, which claims the priority of provisional U.S. Application Ser. No. 60/430,814, filed Dec. 4, 2002 and bearing the same title, both of which are hereby incorporated by reference herein.

Figure 8:
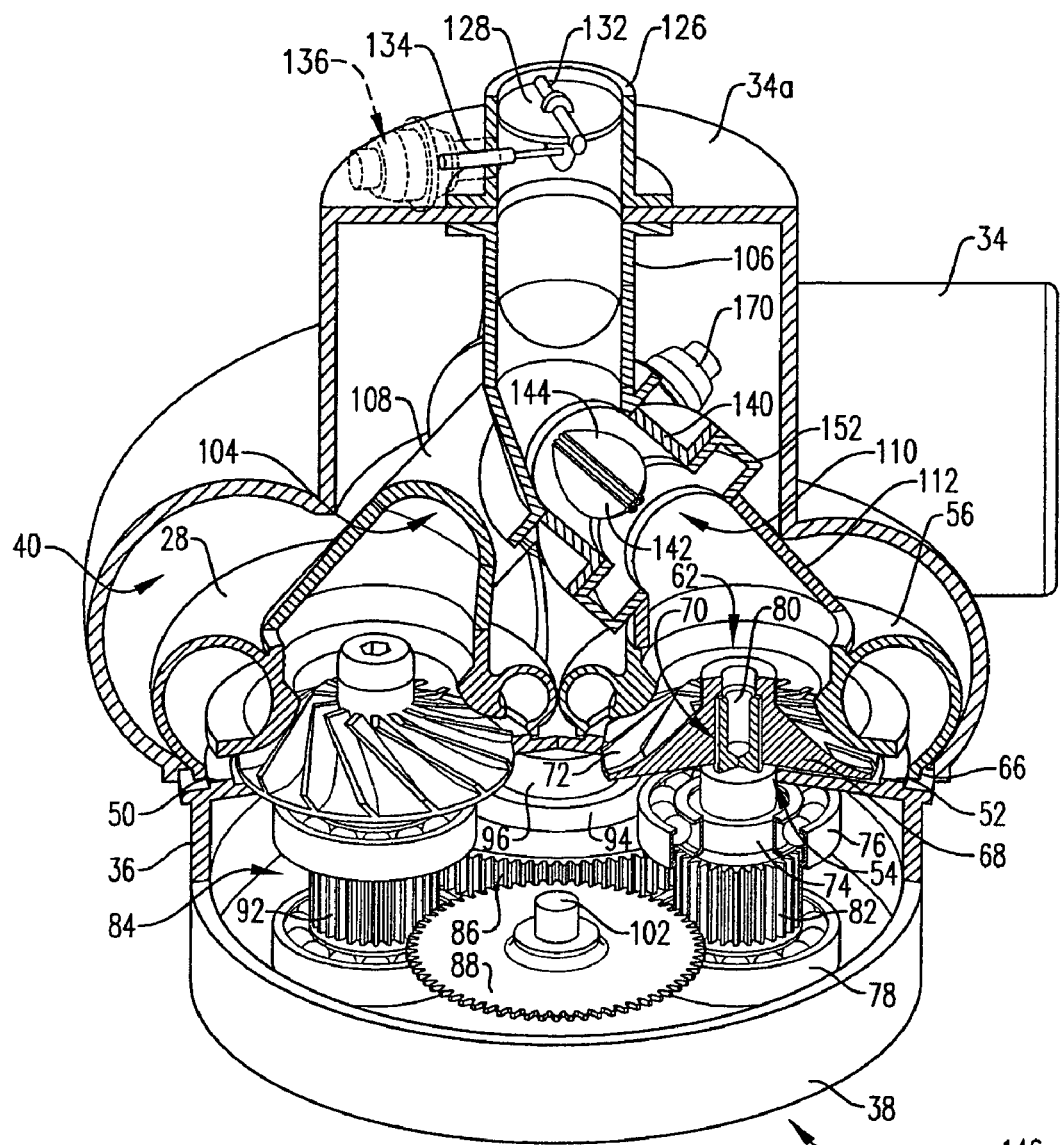
FIG. 8 is an enlarged partial sectional view of the supercharging assembly of the induction system illustrated in FIGS. 1–7 with the inlet valve shown in phantom and some components removed to illustrate the internal configuration of the supercharging assembly and the components of the flow control assembly housed therein.

The impeller 58 is housed within the volute 56 and rotatably supported on the middle case section 36. In the usual manner, when rotating, the impeller 58 induces and causes induction fluid to flow through the volute 56 as described above, where the fluid is pressurized and accelerated. Turning to FIG. 8, the illustrated impeller 58 presents a circular, solid base 68 that spans and is received in the recess defined by the annular ring 52. The impeller 58 further defines a central mounting hole 70 extending through the base 68. The illustrated impeller 58 includes a plurality of curvilinear fins 72 spaced about the periphery of the impeller 58 and sloping in the direction of rotation. As is known in the art, the amount of boost generated by the supercharger 30 is effected by the wheel size of the impeller 58—i.e., the diameter of the base 68—and the trim—i.e., the configuration of the fins 72, including among other things, the size, shape, and spacing of the fins 72. The optimum wheel size and trim for a particular engine application can be calculated using the known technique of compressor mapping. As further detailed below, because the superchargers 28,30 are sometimes operated in series, adjustments to the mapping-determined wheel size and trim may be necessary for one or both of the superchargers 28,30. The impeller 58 is preferably machined from a billet of 7075 T-6 aircraft aluminum, although other suitable materials (e.g., cast aluminum) may be used. It is further preferred to use an impeller commercially available from Applicant. However, the impeller 58 may be variously configured without departing from the spirit of the present invention.

The impeller 58 is drivingly communicated with the transmission subassembly 32 by the transmission 60. In the preferred embodiment, and as shown in FIG. 8, the transmission 60 includes an impeller shaft 74 rotatably supported by a pair of bearing assemblies 76 and 78. In the usual manner, the bearing assemblies 76,78 are preferably press fit within the respective sockets (not shown) formed in the middle and lower case sections 36,38, respectively and a wavy spring washer (not shown) is provided in at least one of the sockets. As is sometimes common because of the extremely high rotational speeds of the impeller 58, additional bearing assemblies (not shown) may be used to support the impeller shaft 74. The construction of the various bearing assemblies used in the illustrated supercharger 30 will not be described in detail, with the understanding that each illustrated assembly includes an inner race suitably fixed (e.g., press fit) to the shaft rotatably supported by the assembly, an outer race suitably fixed to the case section to which the assembly is mounted, and a ball and cage assembly retained between the races. Furthermore, the illustrated bearing assemblies are not prelubricated and require continuous lubrication during operation. However, the principles of the present invention are equally applicable to various other types of bearing assemblies (e.g., prelubricated bearing assemblies, ceramic balls, rolling bearings, tapered bearings, etc.), as well as other types of bearing arrangements, including multiple bearing arrangements. Suitable preferred multiple bearing arrangements are disclosed in applicant's U.S. Pat. Nos. 6,478,469, 6,651,633, and 6,612,747, issued Nov. 12, 2002, Nov. 25, 2003, and Sep. 2, 2003, respectively, and all entitled VELOCITY VARIANCE REDUCING MULTIPLE BEARING ARRANGEMENT FOR IMPELLER SHAFT OF CENTRIFUGAL SUPERCHARGER, all of which are hereby incorporated by reference herein.

The illustrated impeller shaft 74 projects through the impeller shaft opening 54 and into the compressor chamber 40. The mounting hole 70 of the impeller 58 receives the end of the shaft 74 therein, with the impeller 58 preferably being pressed onto the shaft 74 and retained thereon by a cap (not shown, but see the cap shown on the impeller of the supercharger 28 in FIG. 8). It is noted that the cap is secured in place by a screw (not shown) threaded into an axial bore 80 of the shaft 74 (see FIG. 8). For purposes that will subsequently be described, the impeller shaft 74 is preferably machined to include a pinion 82 located between the bearing assemblies 76 and 78. As described in detail below, the transmission 60 cooperates with other components of the transmission subassembly 32 to rotatably drive the impeller 58 via the drive assembly 12 off of the crankshaft C of the engine E.

As previously indicated, the supercharger 28 is very similar in configuration to the supercharger 30 described in detail above. However, and as will subsequently be described in detail, in the preferred induction system 10, the superchargers 28 and 30 cooperate to provide induction fluid to the intake manifold IM of the engine E in various operating phases, including both serial and parallel operating phases. In this regard, one of the superchargers 28,30 preferably presents a reduced wheel size and trim relative to the other supercharger. That is to say, the optimal configuration of one of the superchargers 28,30 could be determined using compressor mapping; however, when the superchargers 28,30 are operated in series, the compressor map for the downstream supercharger will be effected by the output of the upstream supercharger. The downstream supercharger preferably presents a wheel size and trim in a range of about sixty to seventy percent of the wheel size and trim of the upstream supercharger. Additionally, the unique operation of the system 10 enables the use of two relatively smaller superchargers to provide optimal boost to the engine E relative to the wheel size and trim requirements that would otherwise be indicated by compressor mapping for a single supercharger application on the same sized engine. For example, for an eight-cylinder three-hundred horsepower diesel powered engine, compressor mapping may typically indicate a six inch diameter wheel size with appropriate trim for a nine inch diameter volute having a three inch diameter outlet for a single supercharger application. For the same engine, the unique system 10 could provide the same maximum boost using only a three inch diameter wheel size with appropriate trim for a four-five inch diameter volute having a one inch diameter outlet for the supercharger 28 with the downstream supercharger 30 being thirty to forty percent smaller. It is within the ambit of the present invention to utilize various alternative configurations for the superchargers 28,30. For example, although centrifugal superchargers are preferred, for some aspects of the invention, any suitably configured compressors could be utilized. Additionally, while it is important that at least two compressors be utilized, the system 10 could be operated with more than two compressors.

As indicated above, the transmission subassembly 32 drivingly connects the superchargers 28,30 to the drive assembly 12. As detailed below, the preferred transmission subassembly 32 cooperates with the drive assembly 12 to provide a direct, step-up drive that maintains rotation of the impellers of the superchargers 28,30 at a substantially constant higher ratio relative to the rotation of the crankshaft C. In more detail, and turning to FIGS. 3 and 8, the illustrated transmission subassembly 32 broadly includes the previously described supercharger transmission 60 for the supercharger 30, a supercharger transmission 84 for the supercharger 28, a drive gear 86 intercommunicating the transmissions 60 and 84, and a fluid-slinging disc 88 for lubricating the components of the subassembly 32. The supercharger transmission 84 is virtually identical in configuration to the transmission 60 detailed above and includes an impeller shaft 90 having a pinion 92 machined therein. Each of the pinions 82,92 are driven by the drive gear 86. Particularly, the drive gear 86 intermeshes with both of the pinions 82 and 92 and is supported by an input shaft 94. The gear 86 is preferably keyed to the shaft 94, although these components may be fixedly interconnected in any other suitable manner. Similar to the impeller shaft 74, a pair of bearing assemblies (with only the assembly 96 being shown in FIG. 8) press fit within respective sockets (not shown) formed in the corresponding case sections 36,38 rotatably support the input shaft 94. The input shaft 94 projects through a respective shaft opening (not shown) and beyond the outer face of the case section 38 (see FIG. 2).

The drive assembly 12, detailed above, directly powers the supercharging assembly 14 off of the engine E via the transmission subassembly 32. Particularly, the driven sheave 20 of the drive 12 rotatably communicates with the transmission subassembly 32 so that rotation of the crankshaft C effects continuous operation of the supercharging assembly 14. In more detail, and as shown in FIG. 2, the driven sheave 20 of the drive 12 is keyed to the outwardly projecting portion of the input shaft 94. The driven sheave 20 is further retained on the shaft 94 by a screw 98 threaded into an axial bore (not shown) of the shaft 94. Thus, rotation of the crankshaft C effects continuous rotation at a constant ratio of both of the impellers of the superchargers 28,30.

Those ordinarily skilled in the art will appreciate that the gear-type transmission subassembly 32 of the preferred embodiment produces noise that is noticeably greater than a belt drive. It has been determined that the impellers of the superchargers 28,30 actually amplify the noise of the transmission 32, and the noise typically associated with a gear driven supercharger is normally considered undesirable. In this regard, the impeller shafts, such as the shaft 74, are preferably designed to dampen noise that might otherwise propagate through the shafts to the impellers. Such a shaft construction is disclosed in Applicant's issued U.S. Pat. Nos. 6,478,016 and 6,516,788, issued Nov. 12, 2002 and Feb. 11, 2003, respectively, and both entitled GEAR DRIVEN SUPERCHARGER HAVING NOISE REDUCING IMPELLER SHAFT, both of which are hereby incorporated by reference herein.

The transmission subassembly 32 preferably includes a self-contained lubrication system for providing continuous lubrication to the lubricated components of the assembly 32 housed within the transmission chamber 42 during operation. In this regard, the fluid slinging disc 88 is rotatably supported in the chamber 42 for intermeshing rotation with the drive gear 86. The disc 88 is partially submerged in a fluid reservoir portion of the transmission chamber 42 defined below the dashed line 100 in FIG. 3, which represents the top boundary of the reservoir portion. The reservoir portion contains lubrication fluid, such that rotation of the disc 88 causes lubrication fluid to be dispersed throughout the portion of the chamber 42 above the line 100. The slinger disc 88 is suitably fixed (e.g., press fit) to a shaft 102 that is rotatably supported between the case sections 36 and 38, such as with bearing assemblies (not shown). It will be appreciated, that given the dispersion of lubrication fluid throughout the transmission chamber 42, the chamber 42 is preferably sealed, such as around the shaft openings, including the impeller shaft opening 54. Suitable seals are disclosed in the previously incorporated Jones '619 Application. Additionally, operation of the self-dedicated lubrication system, as well as suitable alternative systems are disclosed in the Jones '619 Application.

The transmission subassembly 32 could be variously alternatively configured and could include, for example, separate transmissions for stand alone superchargers wherein the transmissions do not intercommunicate (e.g., stored in separate transmission chambers in separate cases for each stand alone supercharger). Additionally, although a direct, constant ratio drive is preferred, for some aspects of the present invention, the drive and transmission could cooperate to provide a variable drive system (e.g., a clutched system, a system with varying rotational ratios relative to the crankshaft, etc.).

Operation of the preferred supercharging assembly 14 will be summarized below in the discussion of operation of the induction system 10. However, it is within the ambit of the present invention to utilize various alternative configurations for the supercharging assembly. For example, for some aspects of the invention, various types of compressors could be utilized. In addition, more than two compressors could be implemented and the compressors need not be housed in a common case. However, regardless of the configuration of the supercharging assembly, it is important that the compressors are operable to be operated in multiple operating phases, including at least a series phase and a parallel phase.

Turning now to FIGS. 4 through 20, the induction fluid flow control assembly 16 fluidly communicates the superchargers 28 and 30 of the supercharging assembly 14 and controls operation thereof to deliver the compressed induction fluid to the intake manifold IM of the engine E. As detailed herein, the preferred flow control assembly 16 phases the superchargers 28,30 between multiple operating phases, including serial and parallel operation, to supply constant target boost to the intake IM over the entire rev range of the engine E. When the preferred assembly 16 is applied to a variable speed engine, such as the engine E powering the land vehicle T, the supercharging assembly 14 operates as a desirable variable flow compressor, yet utilizes the simple, part-conservative direct drive 12. The illustrated induction fluid flow control assembly 16 broadly includes tubing (identified below) interconnecting the superchargers 28,30 with one another and with the inlet and outlet openings 44,46, and valving (identified below) for controlling the flow of induction fluid through the tubing.

In more detail, and as shown in FIGS. 4–8, the illustrated tubing defines a first passageway 104 (see FIG. 7) that fluidly communicates the case inlet 44 with the inlet of the supercharger 28. The passageway 104 is defined by a Y-fitting 106 and a pipe 108 (see FIG. 4). The fitting 106 is sealed around the inside of the inlet 44 in any suitable manner, such as with a flange welded to the inside of the hat 34a of the hood 34. The pipe 108 is configured to seal around the inlet of the supercharger 28. The illustrated fitting and pipe 106,108 are formed of any suitable material, such as steel or cast aluminum, and are joined in any suitable fashion, such as flange welded or the like. In a similar manner, a second passageway 110 fluidly communicates the case inlet 44 with the inlet 62 of the supercharger 30 (see FIG. 6). The passageway 110 is defined in part by the fitting 106 and a collar 112 (see FIG. 4). As further detailed below, the passageway 110 is also defined in part by components of the valving. A third passageway 114 (see FIG. 7), defined in part by a pipe section 116 (see FIG. 4) fluidly communicates the outlet of the supercharger 28 and the case outlet 46. Although not illustrated, the passageway 114 preferably is defined by piping presenting a diameter common to the pipe section 116 extending continuously through to the outlet 46 in order to facilitate maintaining the induction fluid flowing there through under optimum pressure into the intake manifold IM. In this regard, the piping could be similar to the pipe section 116 or could be integrally formed in the hood 34 of the case 26. A fourth passageway 118 (see FIG. 7), defined by valving components detailed below, fluidly communicates the third passageway 114 and the second passageway 110 so that the outlet of the supercharger 28 is in fluid communication with the inlet 62 of the supercharger 30. A fifth passageway 120 (see FIG. 6), defined by piping 122 (see FIG. 4), fluidly communicates the outlet 64 of the supercharger 30 and the case outlet 46. Similar to the third passageway 114 detailed above, the passageway 120 preferably is defined by piping (not shown) presenting a diameter common to the piping 122 extending continuously through to the outlet 46.

It will be appreciated that the preferred tubing detailed above fluidly communicates the case inlet 44 with each of the inlets of the superchargers 28,30, fluidly communicates each of the outlets of the superchargers 28,30 with the case outlet 46, and for purposes that will subsequently be described, fluidly communicates the outlet of the supercharger 28 with the inlet 62 of the supercharger 30. In this manner, each of the superchargers 28,30 is in fluid communication with the intake manifold IM of the engine E. Particularly, the case outlet 46 is in fluid communication with the intake conduit IC. Although not illustrated, the intake conduit IC preferably includes internal piping having a diameter common to the preferred tubing that fluidly communicates the passageways 114,120 with the plenum box B in order to facilitate maintaining the induction fluid flowing there through under optimum pressure into the intake manifold IM. The illustrated tubing is preferably metal piping presenting a one inch inside diameter. However, the tubing could be variously alternatively configured in any suitable manner. For example, the tubing could be integrally formed in the hood 34. Additionally, the tubing need not be housed within the case 26 and could for example fluidly communicate two or more stand alone superchargers that do not share a common case.

Figure 6:
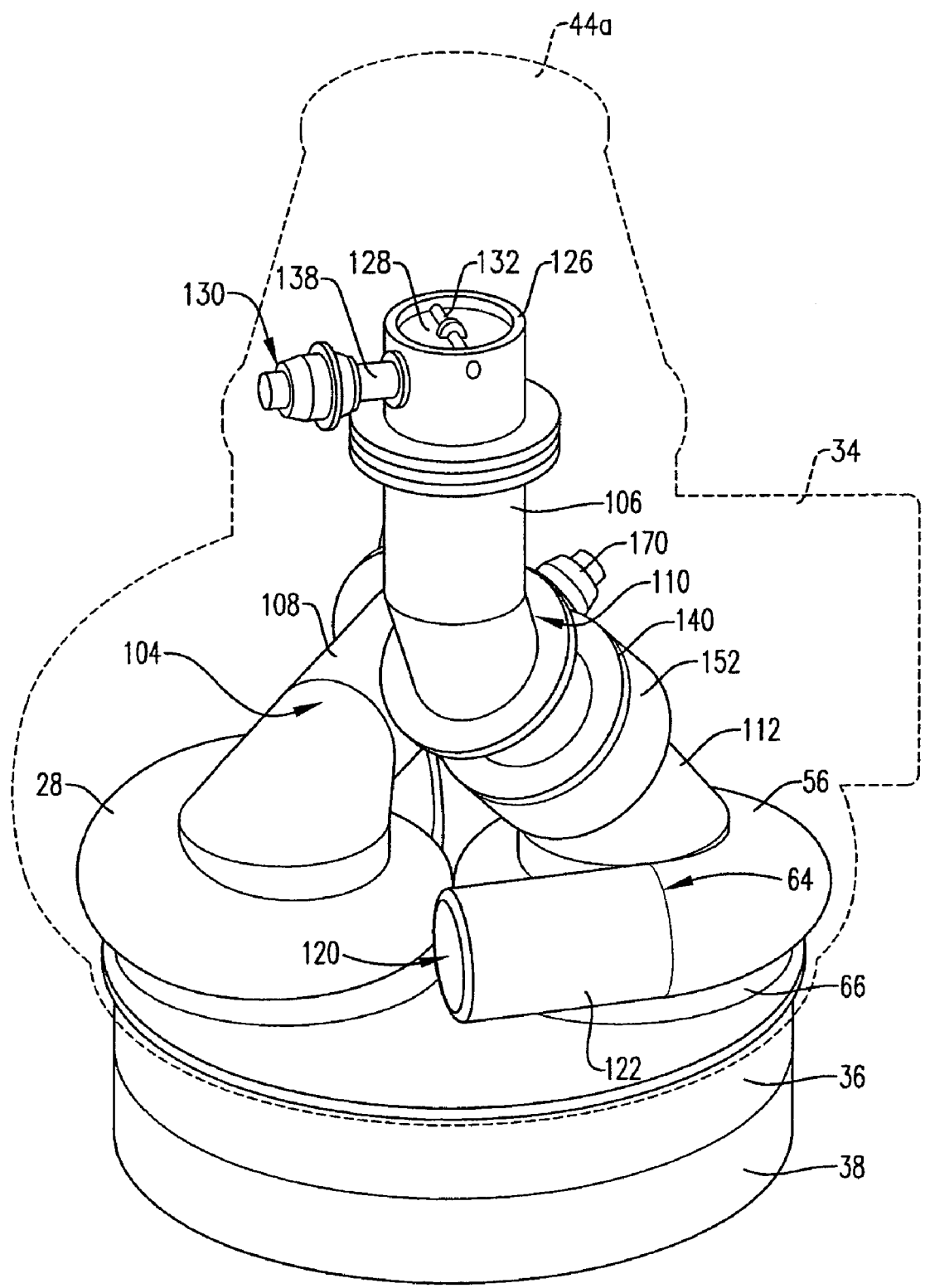
FIG. 6 is an enlarged elevational view of the supercharging assembly of the induction system illustrated in FIGS. 1–5 with the compression chamber hood of the case shown in phantom to illustrate the components of the supercharging and flow control assemblies housed therein.

The preferred valving controls the flow of induction fluid through the tubing and thus through the superchargers 28,30. As detailed herein, the illustrated valving is controlled by pressure conditions within the system 10 that cause the superchargers 28,30 to phase between multiple operating phases, including serial and parallel operation, to supply constant target boost to the intake IM over the entire rev range of the engine E. In more detail, and as shown in FIGS. 4–9, the illustrated valving includes an inlet valve 124 that controls the flow of induction fluid through the case inlet 44. The inlet valve 124 includes a body 126, a throttle flap 128 seated in the body 126, and a control mechanism 130 in controlling communication with the flap 128. The valve body 126 is fixed to the outer surface of the hat 34a of the hood 34 and sealed around the inlet 44 in any suitable manner, such as welding or the like. The throttle flap 128 is carried on a rod 132 supported between the body 126 and pivots relative to the rod 132 into and out of the closed position as shown in FIGS. 6 and 8, wherein induction fluid is generally prevented from flowing through the case inlet 44. It will be appreciated that the flap 128 pivots from the closed position, through various degrees of partially open, one of which is shown schematically in FIG. 18, wherein varying amounts of induction fluid can flow through the inlet 44, into a fully open position shown schematically in FIGS. 12–17 and 19–20, wherein induction fluid flows unimpeded through the inlet 44.

The control mechanism 130 is a pressure controlled mechanism that opens the inlet valve 124 in response to pressure at the inlet 44 downstream of the throttle flap 128. As shown in FIG. 8, and in one manner well known in the art, the illustrated control mechanism 130 includes a plunger 134 coupled to the flap 128 that rides against a float (not shown). The float is in fluid communication with a chamber 136 (see FIG. 8) positioned outwardly of the float. A tube 138 fluidly communicates the chamber 136 and the float with the induction fluid in the body 126 below the flap 128. The plunger 134 is biased against the float and the float is biased into the open position, such as with a spring (not shown). When the pressure in the chamber 136 reaches a predetermined level, the biasing force is overcome and the float is caused to shift, thus allowing the plunger 134 to shift thereby progressively closing the throttle flap 128. Suitable valves are commercially available from OCV Control Valves of Tulsa, Okla. as Model No. OCV 65 Series and from ControlAirInc. of Amherst, N.H. as Model No. Type 400. However, any suitable pressure regulating valve could be utilized. As further detailed below, in the illustrated system 10, the control mechanism 130 is configured to remain in the fully open position as long as the pressure in the valve body 126 downstream of the flap 128 is less than the target boost (e.g., 10–12 psi). Once the pressure in the body 126 exceeds the target boost, the valve 124 begins to partially close, thereby reducing the amount of induction fluid entering the system 10 through the case inlet 44. It will be appreciated that the inlet valve 124 is preferred to ensure the target boost is never exceeded at the intake manifold IM. However, this could be accomplished in a variety of ways or disregarded without departing from the spirit of the present invention. Additionally, an inlet valve is not necessary and alternatively could be variously configured. Suitable alternative inlet valves are disclosed in Applicant's issued U.S. Pat. Nos. 6,474,318, 6,571,780, and 6,691,685, issuing Nov. 5, 2002, Jun. 3, 2003, and Feb. 17, 2004, respectively, all entitled AIR INDUCTION SYSTEM HAVING INLET VALVE, and all of which are hereby incorporated by reference herein.

The illustrated valving further includes a first butterfly valve 140 (see FIG. 4) disposed along the second passageway 110 for controlling the flow of induction fluid through the second passageway 110. The illustrated butterfly valve 140 is disposed between the fitting 106 and the collar 112. The valve 140 is a butterfly-type valve and in the usual manner includes a pair of pivotal gates 142 and 144 (see FIG. 8). Any suitable butterfly valve will suffice and one such butterfly valve is commercially available from Crane Co. of Stamford, Conn. under the designation Duo-Chek Check Valve. However, any suitable check valve could be utilized. The preferred butterfly valve 140 is biased into the closed position as shown in FIG. 4 and schematically in FIGS. 12–13 and 15, wherein induction fluid is prevented from flowing through the second passageway 110 and configured to open in response to downstream pressure conditions. As further detailed below, when the valve 140 is in the closed position, the superchargers 28,30 are operating in series and when the valve 140 is fully open as shown schematically in FIGS. 17–18, the superchargers 28,30 are operating in parallel. It will further be appreciated that the butterfly valve 140 has various partially open positions, some of which are shown schematically in FIGS. 14, 16, and 19–20, wherein varying amounts of induction fluid can flow impeded through the second passageway 110. The valve 140 is positioned upstream of the point of communication where the fourth passageway 118 intersects the second passageway 110; therefore, induction fluid can flow to the inlet 62 of the supercharger 30 via the fourth passageway 118 even when the valve 140 is closed. The valve 140 could be variously alternatively configured and need not be a butterfly-type valve, for example, the valve 140 could be a simple gate valve. However, it is important that the valve 140 be able to control the flow of induction fluid from the case inlet 44 to the supercharger inlet 62 to enable at least series and parallel operating phases.

Similar to the first butterfly valve 140 detailed above, the preferred valving includes a second butterfly valve 146 disposed along the third passageway 114 for controlling the flow of induction fluid through the third passageway 114. The second butterfly valve 146 is very similar in configuration to the valve 140 detailed above. The preferred valve 146 is biased into the closed position as shown schematically in FIGS. 12–14, wherein induction fluid is prevented from flowing through the third passageway 114 and configured to open in response to downstream pressure conditions. As further detailed below, when the valve 146 is in the closed position, the superchargers 28,30 are operating in series and when the valve 146 is fully open as shown schematically in FIGS. 17–18, the superchargers 28,30 are operating in parallel. It will further be appreciated that the butterfly valve 146 has various partially open positions, some of which are shown schematically in FIGS. 15–16 and 19–20, wherein varying amounts of induction fluid can flow impeded through the third passageway 114. The valve 146 is positioned downstream of the point of communication where the fourth passageway 118 intersects the third passageway 114; therefore, induction fluid can flow from the outlet of the supercharger 28 via the fourth passageway 118 even when the valve 146 is closed.

Figure 9:
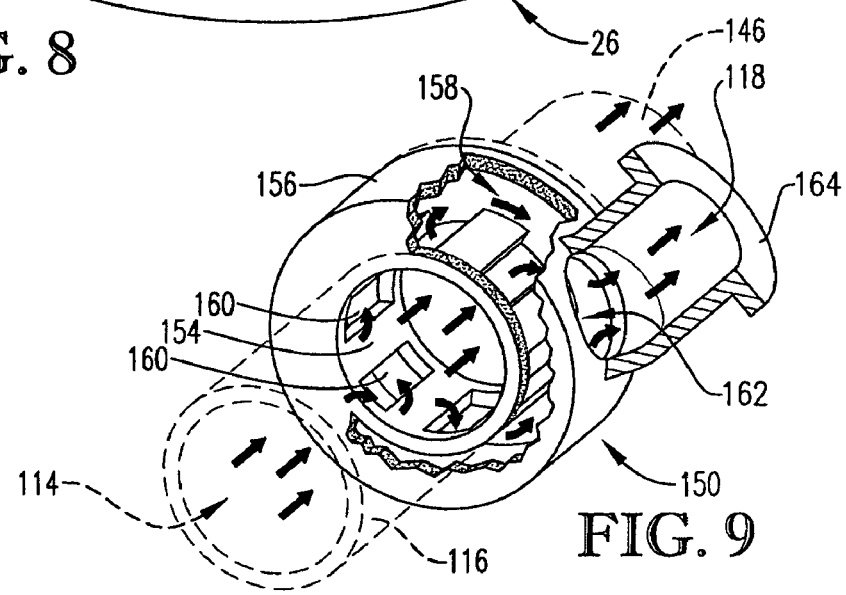

The preferred valving also includes a control valve 148 (see FIG. 4) disposed along the fourth fluid passageway 118 (see FIG. 7) for controlling the flow of induction fluid between the outlet of the supercharger 28 and the inlet 62 of the supercharger 30. In more detail, the fourth fluid passageway 118 is defined between a pair of radial-flow collars 150 and 152. The collar 150 is disposed along the third fluid passageway 114 and defines the point of entry into the fourth fluid passageway 118. The collar 152 is disposed along the second fluid passageway 110 and defines the point of exit out of the fourth passageway 118. The collars 150 and 152 are virtually identical in configuration and therefore only the collar 150 will be described in detail with the understanding that the collar 152 is similarly constructed. The collar 150 is fixed between the pipe section 116 and the butterfly valve 146, such as by welding or the like. As shown in FIG. 9, the collar 150 allows induction fluid to freely flow axially through the collar 150 and also allows induction fluid to flow radially through the circumference of the collar 150. In this regard, the collar 150 includes inner and outer faces 154 and 156, respectively, that define a duct 158 therebetween. A plurality of orthogonal apertures 160 formed through the inner face 154 fluidly communicate the center of the collar 150 with the duct 158. The outer face 156 includes a single orifice 162 through which induction fluid from the duct 158 can flow. Fixed to the collar 150 is an elbow 164 in fluid communication with the orifice 162. The radial-flow collar 152 is similarly configured and is fixed between the butterfly valve 140 and the collar fitting 112. The collar 152 is also fixed to an elbow 166. Disposed between the elbows 164, 166 is the valve 148.

Figure 7:
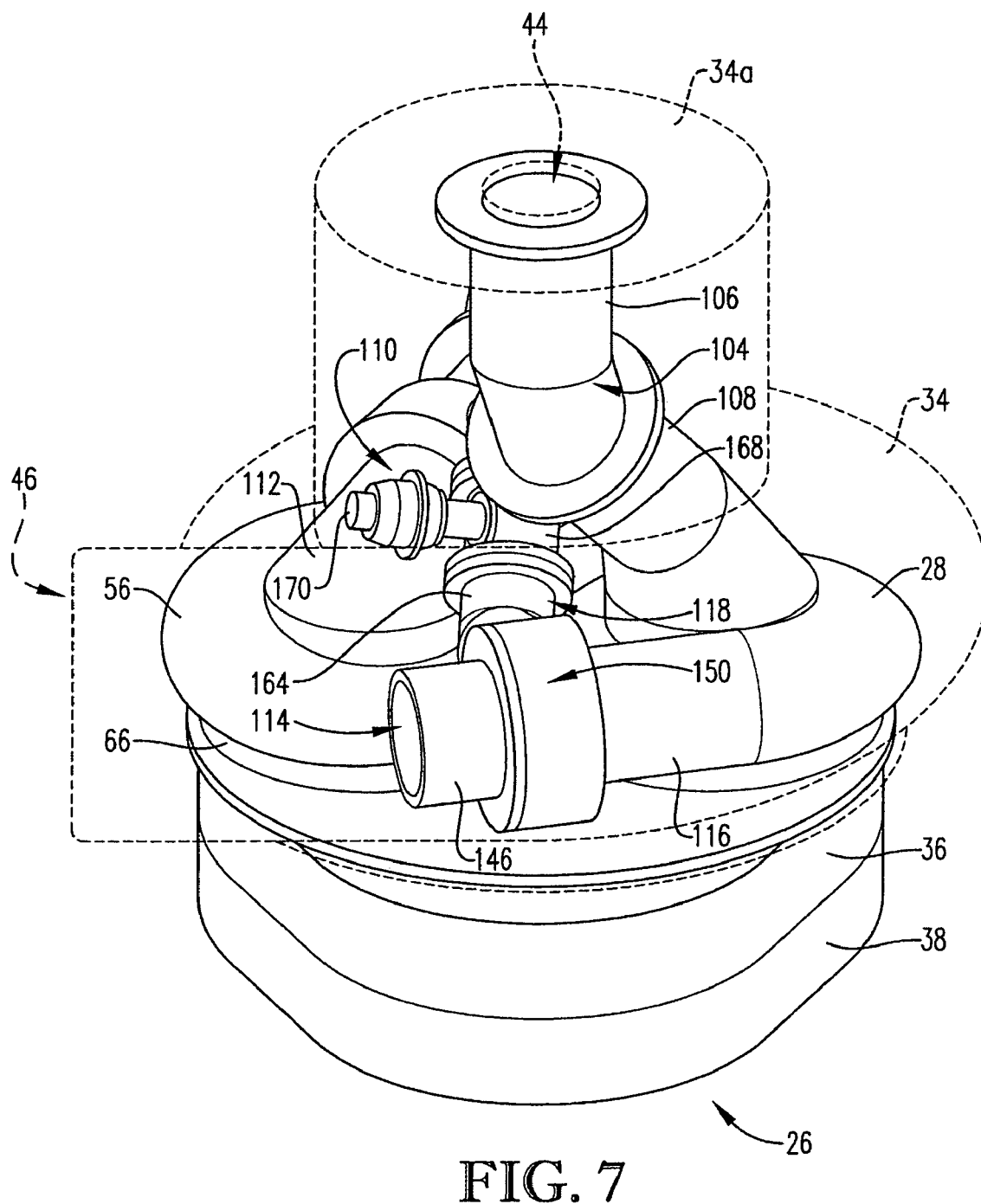
FIG. 7 is an enlarged elevational view of the supercharging assembly similar to FIG. 6 but showing the supercharger assembly from the opposite side with the compression chamber hood of the case shown in phantom to illustrate the components of the supercharging and flow control assemblies housed therein.

The control valve 148 is similar in configuration to the inlet valve 124 previously described in detail and, as shown in FIG. 7, includes a valve body 168, a throttle flap (not shown) seated in the body 168, and a control mechanism 170 in controlling communication with the flap. However, as further detailed below, in the illustrated control valve 148, the control mechanism 170 is configured to phase operation of the superchargers 28,30 between series and parallel operation based on relative pressure conditions on either side of the valve 148. In this regard, the flap of the control valve 148 is biased into the fully open position, as shown schematically in FIG. 12, wherein induction fluid freely flows through the fourth fluid passageway 118 (corresponding to the superchargers 28,30 operating in the series phase as described below). The flap of the control valve 148 pivots through intermediate open positions, some of which are shown schematically in FIGS. 13–16 and 20, wherein reduced amounts of induction fluid flow impeded through the fourth fluid passageway 118. The flap of the control valve 148 pivots into a closed position, as shown schematically in FIGS. 17–19, wherein induction fluid is prevented from flowing through the fourth fluid passageway 118 (corresponding to the superchargers 28,30 operating in the parallel phase as described below). As further detailed below, the control valve 148 remains in the fully open position as long as the pressure in the system 10 downstream of the valve 148 is sufficiently greater than the pressure upstream of the valve 148. Once the pressure in the system 10 downstream of the valve 148 begins to approach the pressure upstream, the valve 148 begins to partially close, thereby reducing the amount of induction fluid flowing from the outlet of the supercharger 28 to the inlet 62 of the supercharger 30. When the pressure in the system 10 downstream of the valve 148 drops below the pressure upstream of the valve 148, the valve 148 closes, thereby preventing any induction fluid from flowing between the superchargers 28,30.

Operation of the preferred induction fluid flow control assembly 16 will be detailed below. However, it is within the ambit of the present invention to utilize various alternative configurations for the flow control assembly. For example, an embedded microcontroller, microcomputer, or other electronic control mechanism can be employed to operate the present valves, using for example electromechanical actuators or solenoids, etc. Additionally, the flow control assembly need not be housed within a common case with the supercharging assembly and need not utilize valving to control the flow of induction fluid through the system. The flow control assembly could also utilize fewer or more valves than those illustrated, such as a dump gate or recirculating valve at the engine intake to ensure that over boost is not supplied to the intake—i.e., to ensure the target boost is never exceeded. However, regardless of the configuration of the flow control assembly, it is important that the assembly is operable to operate the compressors in multiple operating phases, including at least a series phase and a parallel phase.

As previously indicated, the induction fluid flow control assembly 16 phases the superchargers 28,30 between multiple operating phases, including serial and parallel operation, to supply constant target boost to the intake IM over the entire rev range of the engine E. In the preferred air induction system 10, both of the superchargers 28,30 each compress at least some induction fluid for the engine E and substantially all of the induction fluid compressed by the superchargers 28,30 is delivered to the intake manifold IM. Turning now to FIGS. 10–20, in the illustrated air induction system 10, the operating phases include a series phase 172, a transition phase 174, a parallel phase 176, and a throttle phase 178.

Figure 10:
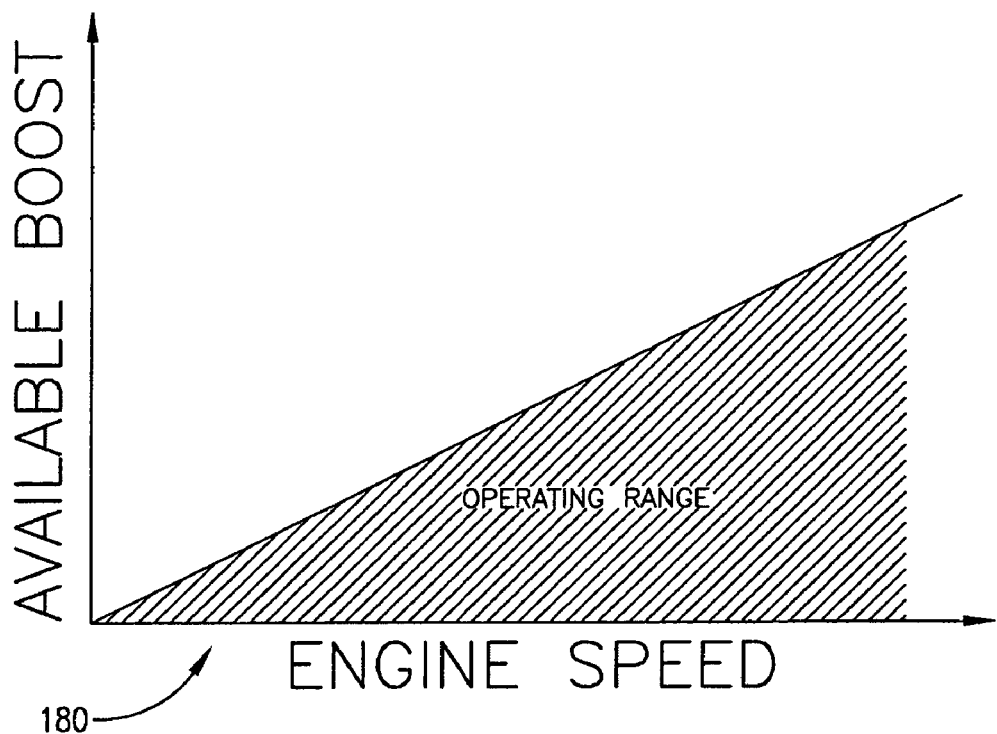
FIG. 10 is a diagram of a boost curve of the first supercharger of the supercharging assembly of the induction system illustrated in FIGS. 1–9 if the first supercharger were operated under ideal conditions as a single supercharger.
Figure 11:
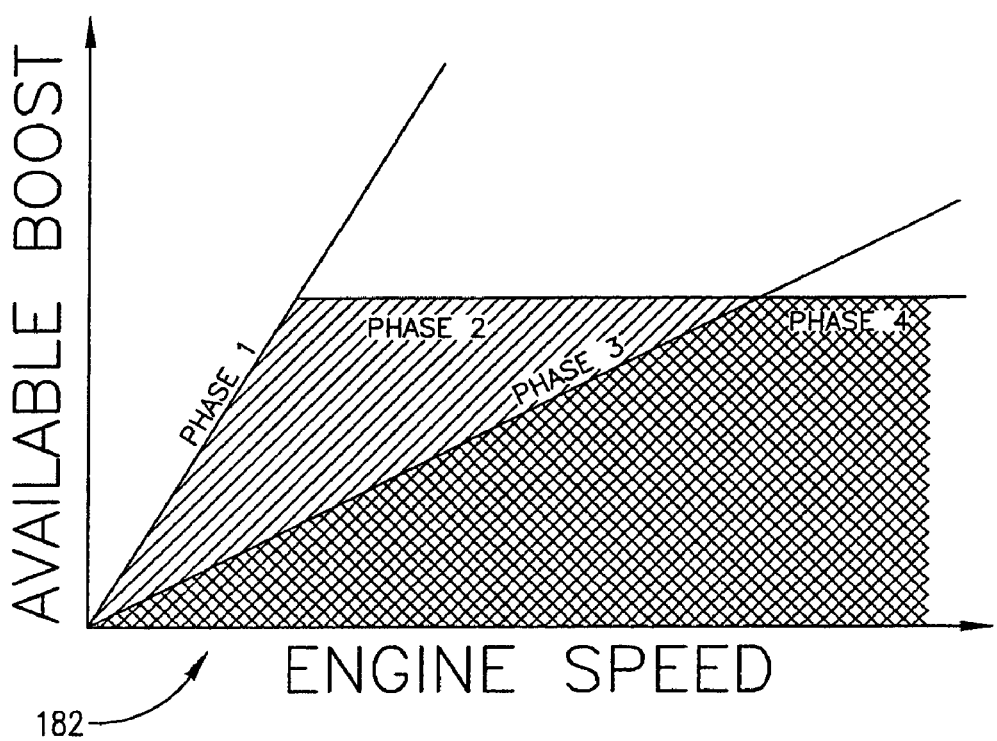
FIG. 11 is a diagram of a boost curve of the induction system illustrated in FIGS. 1–9 operated under ideal conditions in accordance with the preferred embodiment and showing four operating phases.

In more detail, FIG. 10 illustrates a typical boost curve 180 for one of the superchargers 28,30 when operated as a single compressor in the usual manner—that is, if the supercharger were operated in isolation from the rest of the inventive induction system 10. The boost curve 180 denotes "Available Boost" measured in psi over varying "Engine Speed" measured in rpm. As shown in the curve 180, either one of the superchargers 28,30 operating alone may be able to produce a target boost, for example 10–12 psi, at a particular engine rpm; however, the target boost will not be produced at any other rpms and thus is undesirably not constant. FIG. 11 illustrates a boost curve 182 for the illustrated induction system 10 when operated in the preferred manner on the engine E phasing through the phases 172, 174, 176, and 178, wherein "Available Boost" is measured in psi and "Engine Speed" is measured in rpm. It will be appreciated, that the boost curve 182 remains substantially constant at the target boost, for example 10–12 psi, over the entire rev range of the engine E.

Figure 12:
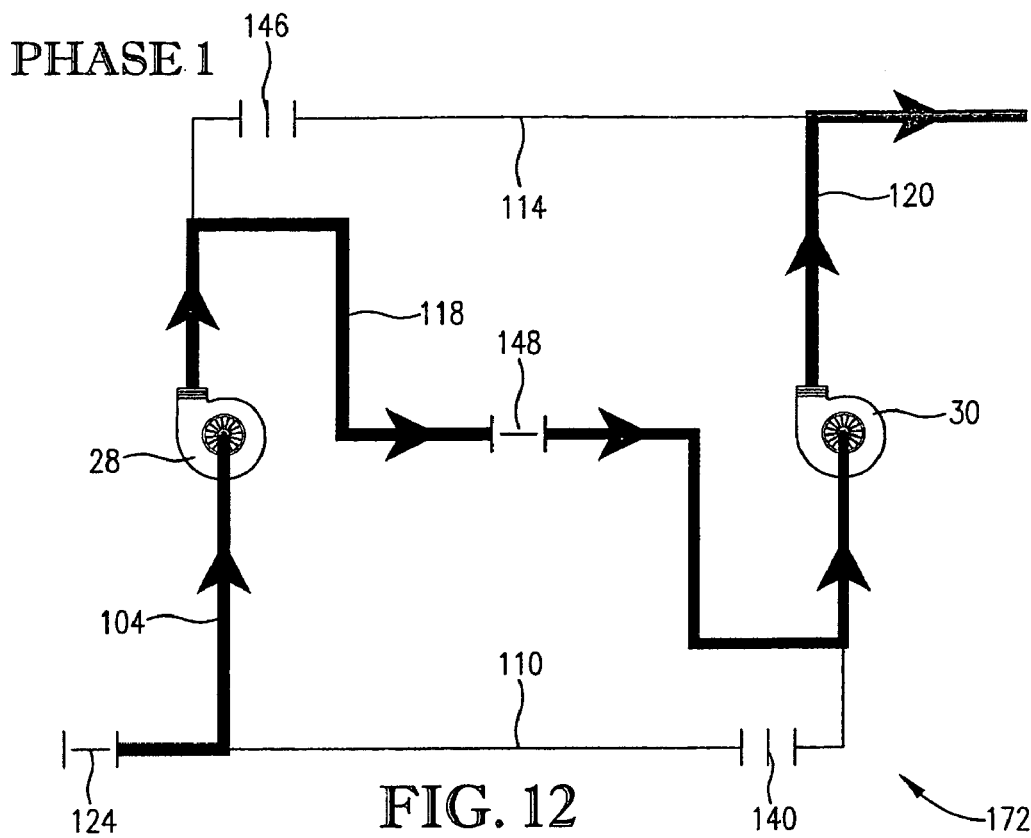
FIG. 12 is a schematic diagram depicting serial operation of the induction system illustrated in FIGS. 1–9 in operating phase one with the inlet and control valves in the fully open position and both gate valves in the fully closed position with the darkened lines and arrows indicating the flow of induction fluid through the system.

In order to obtain the desirable constant target boost curve 182, the illustrated system 10 phases through the preferred phases 172–178 based on pressure conditions within the system 10, wherein these pressure conditions change as the rpm of the engine E increases and thus the flow through the intake manifold IM increases. Particularly, as illustrated in FIG. 12, at low to medium engine rpm—i.e., when the engine E goes from off idle and begins accelerating, the induction system 10 is operating in the series phase 172. In the series phase 172, the inlet valve 124 is in the fully open position, the butterfly valves 140 and 146 are in the fully closed position, and the control valve 148 is in the fully open position. Induction fluid freely flows through the inlet 44 and through the first passageway 104 to the inlet of the supercharger 28 where the fluid is pressurized and accelerated in the volute. The pressurized induction fluid then flows out of the outlet of the supercharger 28 through the fourth passageway 118 into the inlet 62 of the supercharger 30 where the fluid is further pressurized and accelerated in the volute 56 by the impeller 58. The super compressed fluid then flows out of the outlet 64 through the fifth passageway 120 and out of the case outlet 46 through the intake conduit IC and into the plenum box B of the intake manifold IM.

In this series phase 172, the compressor 30 compounds the output of the compressor 28 and thus the two relatively smaller compressors 28,30 can operate at only about one-half the speed to obtain the boost it would take a large compressor operating at twice the speed to produce. In the series phase 172, the system 10 is flowing a relatively lesser amount of induction fluid and thus the system 10 is operating in the lower left quadrant of the ideal "island" of a respective compressor map. In the preferred induction system 10, it is believed the compressors 28,30 operate in the series phase 172 from off idle to about sixty to seventy percent of the rev range (see FIG. 11). It should be noted, that at extremely low flow, such as when the engine is operating at a fairly constant cruising speed, the system 10 may operate in the parallel phase 176. That is to say, the two relatively small compressor wheels of the superchargers 28,30, such as the wheel 58, may operate as one larger compressor wheel operating at the same speed.

The preferred induction system 10 will remain in the series phase 172 as long as the pressure upstream of the control valve 148 is less than the target boost psi. Once the pressure upstream of the valve 148 approaches the target psi, the system 10 will begin phasing over to parallel operation. In the illustrated system 10, this phase occurs in the transition phase 174. As illustrated in FIGS. 13–16, as the engine rpm continues to increase to higher levels—i.e., when the engine E rpm exceeds about sixty to seventy percent of rev range but less than about eighty percent of rev range—the induction system 10 is operating in the transition phase 174. In the transition phase 174, the inlet valve 124 remains in the fully open position, the control valve 148 begins to close, and the butterfly valves 140 and 146 begin to open. It will be appreciated that in this transition phase 174, and as shown in FIGS. 14 and 15, the butterfly valves 140 and 146 may begin opening at different intervals and the opening of one of the valves 140,146 may effect the opening or closing of the other valve 140,146. Finally, as shown in FIG. 16 all three of the valves 140,146,148 will be partially open. In this configuration, induction fluid freely flows through the inlet 44 and a portion of the fluid flows through the first passageway 104 to the inlet of the supercharger 28 where the fluid is pressurized and accelerated while a second portion of the fluid flows through the second passageway 110 to the inlet 62 of the supercharger 30 where it is pressurized and accelerated. A portion of the fluid pressurized by the supercharger 28 flows through the fourth passageway 118 into the inlet 62 of the supercharger 30 where the fluid is further pressurized and accelerated while the other portion of pressurized fluid flows through the third passageway 114 to the outlet 46. Compressed fluid also flows out of the outlet 64 through the fifth passageway 120 and all of the pressurized fluid flows out of the case outlet 46 through the intake conduit IC and into the plenum box B of the intake manifold IM.

In this transition phase 174, the compressor 30 is both compounding some of the output of the compressor 28 and complementing the remaining output of the compressor 28. In the transition phase 174, the system 10 is flowing a relatively greater amount of induction fluid relative to the series phase 172 and thus the system 10 is shifting operation from the lower left quadrant of the ideal "island" of a respective compressor map to the upper right quadrant of the island. In the preferred induction system 10, the compressors 28,30 operate in the transition phase 174 from about sixty to seventy percent of the rev range to about eighty percent of rev range (see FIG. 11).

The preferred induction system 10 will remain in the transition phase 174 until the pressure upstream of the control valve 148 reaches or exceeds the target boost psi. Once the pressure upstream of the valve 148 exceeds the target psi, the system 10 will be in full parallel operation in phase 176. As the engine rpm continues to increase to higher levers—i.e., when the engine E rpm exceeds about eighty percent of rev range—the induction system 10 is operating in the parallel phase 176. As illustrated in FIG. 17, in the parallel phase 176, the inlet valve 124 remains in the fully open position, the control valve 148 is in the fully closed position, and the butterfly valves 140 and 146 are in the fully opened position. In this parallel phase 176, induction fluid freely flows through the inlet 44 and a portion of the fluid flows through the first passageway 104 to the inlet of the supercharger 28 where the fluid is pressurized and accelerated while a second portion of the fluid flows through the second passageway 110 to the inlet 62 of the supercharger 30 where it is pressurized and accelerated. The induction fluid pressurized by the supercharger 28 flows through the third passageway 114 to the outlet 46. The induction fluid pressurized by the supercharger 30 flows out of the outlet 64 through the fifth passageway 120 to the outlet 46. All of the pressurized fluid flows out of the case outlet 46 through the intake conduit IC and into the plenum box B of the intake manifold IM.

In this parallel phase 176, the compressor 30 is complementing the output of the compressor 28 and the compressors cooperate to produce what one larger compressor would produce operating at the same speed. In the parallel phase 176, the system 10 is flowing a relatively large amount of induction fluid relative to the phases 172,174 and thus the system 10 is operating in the upper right quadrant of the ideal "island" of a respective compressor map. In the preferred induction system 10, the compressors 28,30 operate in the parallel phase 174 above about eighty percent of rev range (see FIG. 11).

The preferred induction system 10 will remain in the parallel phase 176 as long as the pressure in the system 10 does not exceed the target boost psi. However, as the engine rpm increases toward one-hundred percent, the target boost may be exceeded. The system 10 is preferably configured to ensure that over boost, or boost in excess of the target boost, is not supplied to the intake manifold IM. There are several ways to accomplish this. In the illustrated induction system 10, once the target boost pressure downstream of the valve 148 exceeds the target psi, the system 10 will either throttle back the intake of induction fluid at the inlet 44 or will "bleed" the over boost back into the system 10. In the illustrated system 10, this occurs in the throttle phase 178. As illustrated in FIGS. 18–20, as the engine rpm continues to increase to the highest levels—i.e., when the engine E rpm approaches one-hundred percent of rev range—the induction system 10 is operating in the throttle phase 178. In the throttle phase 178, the inlet valve 124 begins to close (see FIG. 18), and/or the control valve 148 begins to close and the butterfly valves 140 and 146 begin to close (see FIGS. 19–20). It will be appreciated that in this throttle phase 178, and as shown in FIG. 18, the inlet valve 124 acts as a throttle to simply choke off some of the induction fluid from flowing through the inlet 44 and into the system 10. Alternatively, and as shown in FIGS. 19 and 20, the valves 140, 146, and 148 may begin closing at different intervals as the system 10 corrects itself back to equilibrium. Finally, as shown in FIG. 20 all three of the valves 140,146,148 will be partially closed. In this configuration, induction fluid freely flows through the inlet 44 and a portion of the fluid flows through the first passageway 104 to the inlet of the supercharger 28 where the fluid is pressurized and accelerated while a second portion of the fluid flows through the second passageway 110 to the inlet 62 of the supercharger 30 where it is pressurized and accelerated. A portion of the fluid pressurized by the supercharger 28 flows through the fourth passageway 118 into the inlet 62 of the supercharger 30 where the fluid is further pressurized and accelerated while the other portion of pressurized fluid flows through the third passageway 114 to the outlet 46. Compressed fluid also flows out of the outlet 64 through the fifth passageway 120 and all of the pressurized fluid flows out of the case outlet 46 through the intake conduit IC and into the plenum box B of the intake manifold IM.

In this throttle phase 178, the compressor 30 is both compounding some of the output of the compressor 28 and complementing the remaining output of the compressor 28. In the throttle phase 178, the system 10 is flowing a relatively large amount of induction fluid relative to the other phases 172,174,176 and thus the system 10 is attempting to maintain operation in the upper right quadrant of the ideal "island" of a respective compressor map. In the preferred induction system 10, the compressors 28,30 operate in the throttle phase 178 as the engine E approaches about one-hundred percent of the rev range (see FIG. 11).

It will be appreciated that the air induction system 10, when operated in the preferred manner, enables the advantages of a variable flow system using desirable efficient and responsive centrifugal superchargers without the need for an undesirable variable speed drive. That is to say, the system 10 modifies the unit of flow to adjust for the varying speed of the compressor wheels, e.g., at lower engine rpms, the speed of the compressor wheels is not high enough to generate the desired flow, therefore the system 10 operates the compressors 28,30 in series to compound the flow. However, at higher engine rpms, the speed of the compressor wheels is sufficiently high to generate the desired flow, therefore the system 10 operates the compressors 28,30 in parallel to complement the flow of each. It is within the ambit of the present invention to utilize various alternative configurations for the system 10. For example, the induction system could include an intercooler, for example disposed along the intake conduit IC upstream of the plenum box B. Additionally, the system could be configured to phase between various operating phases based on various engine conditions. However, it is important that the system phases between at least two operating phases wherein the system operates at least partially in series in one phase and at least partially in parallel in another phase.

In operation, the supercharging assembly 14 and the induction fluid flow control assembly 16 are assembled as shown in FIGS. 4 and 5 and the transmission chamber 42 is filled with lubrication fluid. The assembled case 26 is then coupled to the engine E in any suitable manner, such as with appropriate bolt on brackets or the like (not shown). The illustrated system 10 could be included in the original manufacture of the engine E or could be added to the engine E after market. The belt 22 of the drive assembly 12 is then entrained around the drive sheave 18 (coupled to the crankshaft C) and the driven sheave 20 (coupled to the input shaft 94) and the idler sheave 24 is adjusted to the appropriately tension the belt 22. The air induction system 10 is now ready for operation.

When the engine E is started, the rotation of the crankshaft C is transferred to the impeller shafts 74 and 90 via the drive assembly 12 and the transmission subassembly 32 so that the superchargers 28,30 operate continuously with the rotation of the crankshaft C. When the superchargers 28,30 are operating, their impellers (e.g., the impeller 58 of the supercharger 30) rotate at increased speeds relative to the crankshaft C to pressurize and accelerate induction fluid through the respective volute (e.g., the volute 56 of the supercharger 30).

Once the engine E is off idle, the system 10 will operate in the series phase 172 as the engine E accelerates through low and medium rpms. As the engine E continues to accelerate, the compounded flow from the serial operation will eventually change the pressure conditions sufficiently to phase the system 10 into the transition phase 174. As the engine E continues to accelerate through these high rpms, the system 10 will ultimately phase into the parallel phase 176. If the engine E continues acceleration at the high end of its rev range, the system 10 will phase into the throttle phase 178 to maintain the constant supply of target boost to the intake manifold IM. When the engine E decelerates, the above phasing is reversed. Additionally, the engine E is not limited to straight line acceleration or deceleration and the system 10 will phase accordingly in response to varying acceleration and deceleration of the engine E.

As previously indicated, the air induction system of the present invention could be alternatively configured and include, for example, a recirculating valve. One such suitable alternative is the multi-phase compressing air induction system 200 shown schematically in FIG. 21. The system 200 is very similar in configuration to the induction system 10 described in detail above. However, the induction system 200 includes a recirculation valve 202 operable to recirculate over boost back into the system. The illustrated valve 202 is disposed along a fluid passageway 204 fluidly communicating the intake conduit 206 with the inlet of the downstream compressor 208. The fluid passageway 204 is preferably in communication with the downstream-most passageway in the system 200, such as disposed just before the case outlet, or in communication with the intake manifold itself. The fluid passageway 204 is also preferably in communication with the inlet of the compressor 208 upstream of the gate valve controlling parallel flow of induction fluid from the case inlet to the compressor 208. The valve 202 is a butterfly-type valve, similar to the butterfly valves 140,146 previously described. However, the valve 202 is configured to open only if the pressure in the passageway 204 downstream of the valve 202 exceeds the target boost pressure. In this manner, the valve 202 opens to bleed any over boost back into the system 200.

As indicated above, the principles of the present invention are not limited to induction systems for engines and equally apply to some non-vehicle applications, such as industrial conveyor systems. One such system is the pneumatic conveyor 300 illustrated in FIG. 22. The illustrated conveyor 300 includes tubing 302 for transporting material, such as particulate P, from place to place, such as through various processing stations in a plant. The tubing 302 is in communication with a hopper 304 for introducing the particulate P into the tubing 302.

The illustrated conveyor 300 is a pneumatic conveyor and in this regard includes a multi-phase centrifugal compressing air system 306 in communication with the tubing 302 for supplying compressed air into the tubing 302 to entrain the particulate P and force the particulate-entrained air stream through the tubing 302. The system 306 is similar in many respects to the air induction system 10 described in detail above. However, the system 306 includes centrifugal compressors that are powered by any suitable power source (not shown), such as an electric motor or the like. Additionally, the system 306 includes a controller 308 that controls phasing of the compressors between series and parallel operating phases. The illustrated controller 308 includes a plurality of sensors 310 configured to sense pressure changes within the tubing 302. When a change in pressure is detected by one of the sensors 310, the system 306 preferably switches operating phases to counteract the pressure change. For example, the sensors 310 could be in communication with the valving of the fluid flow control assembly of the system 306 to cause the valves to open and close based on predetermined minimum or maximum pressure levels within the tubing 302. Alternatively, the controller 308 could include alarms (not shown) in communication with the sensors 308 that activate when the predetermined pressure levels are present. In response to the alarms, a user could manually operate controls (not shown) on the controller 308 to cause the valving to open and/or close. The illustrated system 306 preferably operates in parallel during normal operation and phases to series operation when the downstream pressure sufficiently changes. For example, when a clog in the tubing 302 occurs, such as at a bend in the tubing 302, the pressure upstream of the clog will significantly elevate and the pressure downstream of the clog will significantly drop off. The preferred sensors 310 communicate this information to the controller 308 which in turn phases the system 306 into series operating phase to ramp up the boost output and force the clog to disperse or exit the tubing 302. Once the clog has been resolved, the pressure conditions return to normal and the system 306 returns to parallel operation. The system could be variously alternatively configured and could be powered and controlled in any number of suitable ways.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

The invention claimed is:

1. A method of supplying compressed air to a system, said method comprising the steps of:
    (a) driving a first compressor by a power source shaft to compress air;
    (b) driving a second compressor by the power source shaft to compress air;
    (c) operating the compressors at least partially in series so that at least some air that is compressed by the first compressor is further compressed by the second compressor and then supplied to the system; and
    (d) operating the compressors at least partially in parallel so that at least a portion of air is compressed by the first compressor and at least another portion of air is compressed by the second compressor and the at least a portion and at least another portion of compressed air are supplied to the system without passing through the other compressor,
    said driving steps of (a) and (b) each being performed so that both compressors are continuously operated by the power source shaft at a substantially constant relative speed to the power source shaft speed during the operating steps of (c) and (d).

2. The method as claimed in claim 1,
    step (d) being performed after step (c) so that operation of the compressors phases from at least partially in series to at least partially in parallel in response to a predetermined condition,
    said predetermined condition comprising a decrease in pressure in the system downstream of the first and second compressors.

3. The method as claimed in claim 1,
    step (d) including the step of switching operation of the compressors to substantially fully parallel in response to a predetermined condition so that at least a portion of air is compressed by the first compressor and at least another portion of air is compressed by the second compressor and the at least a portion and at least another portion of compressed air are supplied to the system without passing through the other compressor wherein said at least a portion and said at least another portion of compressed air comprise substantially all compressed air supplied to the system.

4. The method as claimed in claim 1,
    step (d) including the step of switching operation of the compressors to substantially fully parallel in response to a predetermined condition so that at least a portion of air is compressed by the first compressors and at least another portion of air is compressed by the second compressor and the at least a portion and at least another portion of compressed air are supplied to the system without passing through the other compressor wherein said at least a portion and said at least another portion of compressed air comprise substantially all compressed air supplied to the system,
    said predetermined condition being a decrease in pressure in the system downstream of the first and second compressors.

5. The method as claimed in claim 1,
    steps (a) and (b) including the common step of intermeshing a common gear between the compressors.

6. The method as claimed in claim 1,
    steps (c) and (d) each including the step of operating both compressors so that each compressor compresses at least some air that is supplied to the system whenever the power source is operating.

7. The method as claimed in claim 6,
    steps (c) and (d) each further including the step of delivering substantially all of the air compressed by the compressors to the system.

8. The method as claimed in claim 1,
    step (c) including the step of operating the compressors substantially fully in series so that substantially all air that is compressed by the first compressor is further compressed by the second compressor and then supplied to the system.

9. The method as claimed in claim 1; and
    (e) housing both compressors substantially within a case.

10. The method as claimed in claim 1; and
    (e) intercommunicating the first and second compressors and the system,
    step (e) including the steps of fluidly communicating the first and second compressors with a serial passageway and disposing a first valve along the serial passageway for controlling the flow of compressed air there through.

11. The method as claimed in claim 10,
    step (d) including the step of shifting the first valve into a closed position wherein compressed air is prevented from flowing through said serial passageway.

12. The method as claimed in claim 1,
    (e) intercommunicating the first and second compressors and the system,
    step (e) including the steps of fluidly communicating the first and second compressors with a serial passageway and disposing a first valve along the serial passageway for controlling the flow of compressed air there through,
    step (c) including the step of shifting the first valve into an open position wherein compressed air is permitted to flow through said serial passageway.

13. A method of supplying compressed air to a system, said method comprising the steps of:
    (a) driving a first compressor by a power source to compress air;

(b) driving a second compressor by the power source to compress air;

(c) operating the compressors at least partially in series so that at least some air that is compressed by the first compressor is further compressed by the second compressor and then supplied to the system; and (d) operating the compressors at least partially in parallel so that at least a portion of air is compressed by the first compressor and at least another portion of air is compressed by the second compressor and the at least a portion and at least another portion of compressed air are supplied to the system without passing through the other compressor, steps (a) and (b) each including the step of drivingly connecting the compressors to the power source so that each of the compressors operates continuously with operation of the power source, steps (a) and (b) including the common step of intermeshing a common gear between the compressors, steps (a) and (b) further including the common steps of entraining an endless element around at least a portion of the power source and driving the common gear at least in part with the endless element.

14. A method of supplying compressed air to a system, said method comprising the steps of:

(a) driving a first compressor off of a power source to compress air;

(b) driving a second compressor off of the power source to compress air;

(c) operating the compressors at least partially in series so that at least some air that is compressed by the first compressor is further compressed by the second compressor and then supplied to the system;

(d) operating the compressors at least partially in parallel so that at least a portion of air is compressed by the first compressor and at least another portion of air is compressed by the second compressor and the at least a portion and at least another portion of compressed air are supplied to the system without passing through the other compressor; and (e) intercommunicating the first and second compressors and the system, step (e) including the steps of fluidly communicating the first and second compressors with a serial passageway and disposing a first valve along the serial passageway for controlling the flow of compressed air there through, step (e) including the steps of fluidly communicating the first compressor and the system with an additional passageway and disposing a second valve along the additional passageway for controlling the flow of compressed air there through.

15. The method as claimed in claim 14, step (c) including the step of shifting the second valve into a closed position wherein compressed air is prevented from flowing through said additional passageway.

16. The method as claimed in claim 14, step (d) including the step of shifting the second valve into an open position wherein compressed air is permitted to flow through said additional passageway.

17. The method as claimed in claim 14, step (e) including the steps of fluidly communicating the second compressor and the atmosphere with a parallel passageway and disposing a third valve along the parallel passageway for controlling the flow of air there through.

18. The method as claimed in claim 17, step (e) including the step of fluidly communicating the atmosphere, the first compressor, and the parallel passageway with an inlet passageway and disposing a fourth valve along said inlet passageway for controlling the flow of air there through.

19. The method as claimed in claim 18; and (f) shifting the fourth valve into a partially closed position wherein at least some air is prevented from flowing through said inlet passageway.

20. The method as claimed in claim 17, step (c) including the step of shifting the third valve into a closed position wherein air is prevented from flowing through said parallel passageway.

21. The method as claimed in claim 20, step (d) including the step of shifting the third valve into an open position wherein air is permitted to flow through the parallel passageway.

22. A multiphase compressing air assembly for supplying compressed air to a system, said assembly comprising:

a first compressor drivingly connectable to a power source shaft and operable to compress air for the system, said first compressor including a first inlet, a spaced first outlet, and a first rotatable impeller fluidly between the first inlet and first outlet to compress air;

a second compressor drivingly connectable to the power source shaft and operable to compress air for the system, said second compressor including a second inlet, a spaced second outlet, and a second rotatable impeller fluidly between the second inlet and second outlet to compress air; and a fluid flow control assembly fluidly intercommunicating the compressors so that the compressors cooperatively provide compressed air to the system in a number of operating phases, including a first phase in which at least some compressed air from the first outlet is supplied to the second inlet and a second phase in which at least some compressed air from the first and second outlets is supplied to the system without passing through the other compressor, said first and second compressors being drivingly connectable to the power source shaft wherein both of the impellers are rotated continuously by the power source shaft and at a substantially constant relative speed to the power source shaft speed during the operating phases of the compressors.

23. The assembly as claimed in claim 22; and a drive assembly operable to drivingly connect the compressors to the power source shaft.

24. The assembly as claimed in claim 23, said first and second impellers each being operable to compress air for the system when rotated, said first and second compressors including a transmission drivingly connecting the impellers to the drive assembly, said transmission cooperating with the drive assembly to maintain rotation of the impellers at the substantially constant speed relative to operation of the power source.

25. The assembly as claimed in claim 24, said transmission including a plurality of intermeshing gears with at least one of said gears being common to both compressors.

26. The assembly as claimed in claim 22, said fluid flow control assembly fluidly intercommunicating the compressors so that in all operating phases both compressors compress at least some air for the system whenever the power source is operating.

27. The assembly as claimed in claim 26,
said fluid flow control assembly being operable to fluidly intercommunicate the compressors with the system so that in all operating phases substantially all of the air compressed by each of the compressors is delivered to the system.

28. The assembly as claimed in claim 22,
said first phase including a series phase in which substantially all compressed air from the first outlet is supplied to the second inlet.

29. The assembly as claimed in claim 28,
said second phase including a parallel phase in which substantially all compressed air from the first and second outlets is supplied directly to the system.

30. The assembly as claimed in claim 29,
said fluid flow control assembly being configured to switch operation of the compressors from the series phase to the parallel phase in response to a predetermined condition.

31. The assembly as claimed in claim 22,
said first phase including a series phase in which substantially all compressed air from the first outlet is supplied to the second inlet,
said second phase including a parallel phase in which substantially all compressed air from the first and second outlets is supplied directly to the system,
said fluid flow control assembly being configured to switch operation of the compressors from the series phase to the parallel phase in response to a predetermined condition,
said predetermined condition being a decrease in pressure in the system downstream of the first and second compressors.

32. The assembly as claimed in claim 31,
said fluid flow control assembly being configured to switch operation of the compressors from the parallel phase to the series phase in response to a second predetermined condition.

33. The assembly as claimed in claim 32,
said predetermined condition being an increase in pressure in the system downstream of the first and second compressors.

34. The assembly as claimed in claim 22; and
a case presenting a compression chamber and a transmission chamber,
said first and second compressors being at least partially housed within said compression chamber.

35. The assembly as claimed in claim 22,
said fluid flow control assembly including a passageway fluidly communicating said first outlet and said second inlet,
said fluid flow control assembly further including a first valve disposed along said passageway for controlling the flow of compressed air there through.

36. The assembly as claimed in claim 22,
said fluid flow control assembly including a passageway fluidly communicating said first outlet and said second inlet,
said fluid flow control assembly further including a first valve disposed along said passageway for controlling the flow of compressed air there through,
said first valve shiftable between an open position wherein compressed air is permitted to flow through said passageway and a closed position wherein compressed air is prevented from flowing through said passageway.

37. A multiphase compressing air assembly for supplying compressed air to a system, said assembly comprising:
a first compressor drivingly connectable to a power source and operable to compress air for the system,
said first compressor including a first inlet, a spaced first outlet, and a first impeller fluidly between the first inlet and first outlet to compress air;
a second compressor drivingly connectable to the power source and operable to compress air for the system,
said second compressor including a second inlet, a spaced second outlet, and a second impeller fluidly between the second inlet and second outlet to compress air;
a fluid flow control assembly fluidly intercommunicating the compressors so that the compressors cooperatively provide compressed air to the system in a number of operating phases, including a first phase in which at least some compressed air from the first outlet is supplied to the second inlet and a second phase in which at least some compressed air from the first and second outlets is supplied to the system without passing through the other compressor; and
a drive assembly operable to drivingly connect the compressors to the power source so that each of the compressors operates continuously with operation of the power source,
said first and second impellers being rotatable, each being operable to compress air for the system when rotated,
said first and second compressors including a transmission drivingly connecting the impellers to the drive assembly,
said transmission cooperating with the drive assembly to maintain rotation of the impellers at a substantially constant ratio relative to operation of the power source,
said transmission including a plurality of intermeshing gears with at least one of said gears being common to both compressors,
said transmission including a common rotatable transmission shaft coupled to said common gear,
said drive assembly including an endless element entraining at least a portion of said common shaft and being operable to entrain at least a portion of the power source.

38. A multiphase compressing air assembly for supplying compressed air to a system, said assembly comprising:
a first compressor drivingly connectable to a power source and operable to compress air for the system,
said first compressor including a first inlet, a spaced first outlet, and a first impeller fluidly between the first inlet and first outlet to compress air;
a second compressor drivingly connectable to the power source and operable to compress air for the system,
said second compressor including a second inlet, a spaced second outlet, and a second impeller fluidly between the second inlet and second outlet to compress air; and
a fluid flow control assembly fluidly intercommunicating the compressors so that the compressors cooperatively provide compressed air to the system in a number of operating phases, including a first phase in which at least some compressed air from the first outlet is supplied to the second inlet and a second phase in which at least some compressed air from the first and second outlets is supplied to the system without passing through the other compressor, said fluid flow control assembly including a passageway fluidly communicating said first outlet and said second inlet, said fluid flow control assembly further including a first valve disposed along said passageway for controlling the flow of compressed air there through, said fluid flow control assembly including an additional passageway in fluid communication with said first outlet and operable to be in fluid communication with the system, said fluid flow control assembly further including a second valve disposed along said additional passageway downstream of said first-mentioned passageway for controlling the flow of compressed air through said additional passageway.

39. The assembly as claimed in claim 38, said second valve shiftable between an open position wherein compressed air is permitted to flow through said additional passageway and a closed position wherein compressed air is prevented from flowing through said additional passageway.

40. The assembly as claimed in claim 38, said fluid flow control assembly including a second additional passageway in fluid communication with said second inlet, said fluid flow control assembly further including a third valve disposed along said second additional passageway upstream of said first-mentioned passageway for controlling the flow of air through said second additional passageway.

41. The assembly as claimed in claim 40, said third valve shiftable between an open position wherein air is permitted to flow through said second additional passageway and a closed position wherein air is prevented from flowing through said second additional passageway.

42. The assembly as claimed in claim 40; and a case presenting a compression chamber and a transmission chamber, said first and second compressors and said fluid flow control assembly being at least partially housed within said compression chamber, said compression chamber presenting a case inlet in fluid communication with the atmosphere.

43. The assembly as claimed in claim 42, said fluid flow control assembly including a third additional passageway fluidly communicating the case inlet with said first inlet and fluidly communicating the case inlet with said second additional passageway, said fluid flow control assembly further including a fourth valve disposed along said third additional passageway for controlling the flow of air there through.

44. The assembly as claimed in claim 43, said fourth valve shiftable between an open position wherein air is permitted to flow through said third additional passageway and a partially closed position wherein at least some air is prevented from flowing through said third additional passageway.

45. In a pneumatic conveyor including tubing and a power source shaft, an improved centrifugal air compressing system comprising:

a first compressor drivingly connected to the power source shaft for compressing air for the tubing, said first compressor including a first inlet, a spaced first outlet, and a first rotatable impeller fluidly between the first inlet and first outlet to compress air;

a second compressor drivingly connected to the power source shaft for compressing air for the tubing, said second compressor including a second inlet, a spaced second outlet, and a second rotatable impeller fluidly between the second inlet and second outlet to compress air; and a fluid flow control assembly fluidly intercommunicating the compressors so that the compressors cooperatively provide compressed air to the tubing in a number of operating phases, including a first phase in which at least some compressed air from the first outlet is supplied to the second inlet and a second phase in which at least some compressed air from the first and second outlets is supplied to the tubing without passing through the other compressor, said first and second compressors being drivingly connected to the power source shaft wherein both of the impellers are rotated continuously by the power source shaft and at a substantially constant relative speed to the power source shaft speed during the operating phases of the compressors.

46. In a pneumatic conveyor as claimed in claim 45; and a drive assembly drivingly connecting the compressors to the power source.

47. In a pneumatic conveyor as claimed in claim 46, said first and second impellers being rotatable to compress air for the tubing when rotated, said first and second compressors including a transmission drivingly connecting the impellers to the drive assembly, said transmission cooperating with the drive assembly to maintain rotation of the impellers at the substantially constant speed relative to the operation of the power source.

48. In a pneumatic conveyor as claimed in claim 47, said transmission including a plurality of intermeshing gears with at least one of said gears being common to both compressors.

49. In a pneumatic conveyor as claimed in claim 45, said fluid flow control assembly fluidly intercommunicating the compressors so that in all operating phases both compressors compress at least some air for the tubing whenever the power source is operating.

50. In a pneumatic conveyor as claimed in claim 49, said fluid flow control assembly being operable to fluidly intercommunicate the compressors with the tubing so that in all operating phases substantially all of the air compressed by each of the compressors is delivered to the tubing.

51. In a pneumatic conveyor as claimed in claim 45, said first phase including a series phase in which substantially all compressed air from the first outlet is supplied to the second inlet.

52. In a pneumatic conveyor as claimed in claim 51, said second phase including a parallel phase in which substantially all compressed air from the first and second outlets is supplied directly to the tubing.

53. In a pneumatic conveyor as claimed in claim 52, said fluid flow control assembly being configured to switch operation of the compressors from the series phase to the parallel phase in response to a predetermined condition.

54. In a pneumatic conveyor as claimed in claim 45, said first phase including a series phase in which substantially all compressed air from the first outlet is supplied to the second inlet, said second phase including a parallel phase in which substantially all compressed air from the first and second outlets is supplied directly to the tubing, said fluid flow control assembly being configured to switch operation of the series phase to the parallel phase in response to a predetermined condition, said predetermined condition being a decrease in pressure in the tubing downstream of the first and second compressors.

55. In a pneumatic conveyor as claimed in claim 54, said fluid flow control assembly being configured to switch operation of the compressors from the parallel phase to the series phase in response to a second predetermined condition.

56. In a pneumatic conveyor as claimed in claim 55, said predetermined condition being an increase in pressure in the tubing downstream of the first and second compressors.

57. In a pneumatic conveyor as claimed in claim 45; and a case presenting a compression chamber and a transmission chamber, said first and second compressors being at least partially housed within said compression chamber.

58. In a pneumatic conveyor as claimed in claim 45, said fluid flow control assembly including a passageway fluidly communicating said first outlet and said second inlet, said fluid flow control assembly further including a first valve disposed along said passageway for controlling the flow of compressed air there through.

59. In a pneumatic conveyor as claimed in claim 45, said fluid flow control assembly including a passageway fluidly communicating said first outlet and said second inlet, said fluid flow control assembly further including a first valve disposed along said passageway for controlling the flow of compressed air there through, said first valve shiftable between an open position wherein compressed air is permitted to flow through said passageway and a closed position wherein compressed air is prevented from flowing through said passageway.

60. In a pneumatic conveyor including tubing and a power source, an improved centrifugal air compressing system comprising:

a first compressor drivingly connected to the power source for compressing air for the tubing, said first compressor including a first inlet, a spaced first outlet, and a first impeller fluidly between the first inlet and first outlet to compress air;

a second compressor drivingly connected to the power source for compressing air for the tubing, said second compressor including a second inlet, a spaced second outlet, and a second impeller fluidly between the second inlet and second outlet to compress air;

a fluid flow control assembly fluidly intercommunicating the compressors so that the compressors cooperatively provide compressed air to the tubing in a number of operating phases, including a first phase in which at least some compressed air from the first outlet is supplied to the second inlet and a second phase in which at least some compressed air from the first and second outlets is supplied to the tubing without passing through the other compressor; and a drive assembly drivingly connecting the compressors to the power source so that each of the compressors operates continuously with operation of the power source, said first and second impellers being rotatable to compress air for the tubing when rotated, said first and second compressors including a transmission drivingly connecting the impellers to the drive assembly, said transmission cooperating with the drive assembly to maintain rotation of the impellers at a substantially constant ratio relative to the operation of the power source, said transmission including a plurality of intermeshing gears with at least one of said gears being common to both compressors, said transmission including a common rotatable transmission shaft coupled to said common gear, said drive assembly including an endless element entraining at least a portion of said common shaft and at least a portion of the power source.

61. In a pneumatic conveyor including tubing and a power source, an improved centrifugal air compressing system comprising:

a first compressor drivingly connected to the power source for compressing air for the tubing, said first compressor including a first inlet, a spaced first outlet, and a first impeller fluidly between the first inlet and first outlet to compress air;

a second compressor drivingly connected to the power source for compressing air for the tubing, said second compressor including a second inlet, a spaced second outlet, and a second impeller fluidly between the second inlet and second outlet to compress air; and a fluid flow control assembly fluidly intercommunicating the compressors so that the compressors cooperatively provide compressed air to the tubing in a number of operating phases, including a first phase in which at least some compressed air from the first outlet is supplied to the second inlet and a second phase in which at least some compressed air from the first and second outlets is supplied to the tubing without passing through the other compressor, said fluid flow control assembly including a passageway fluidly communicating said first outlet and said second inlet, said fluid flow control assembly further including a first valve disposed along said passageway for controlling the flow of compressed air there through, said fluid flow control assembly including an additional passageway in fluid communication with said first outlet and the tubing, said fluid flow control assembly further including a second valve disposed along said additional passageway downstream of said first-mentioned passageway for controlling the flow of compressed air through said additional passageway.

62. In a pneumatic conveyor as claimed in claim 61, said second valve shiftable between an open position wherein compressed air is permitted to flow through said additional passageway and a closed position wherein compressed air is prevented from flowing through said additional passageway.

63. In a pneumatic conveyor as claimed in claim 61, said fluid flow control assembly including a second additional passageway in fluid communication with said second inlet, said fluid flow control assembly further including a third valve disposed along said second additional passageway upstream of said first-mentioned passageway for controlling the flow of air through said second additional passageway.

64. In a pneumatic conveyor as claimed in claim 63, said third valve shiftable between an open position wherein air is permitted to flow through said second additional passageway and a closed position wherein air is prevented from flowing through said second additional passageway.

65. In a pneumatic conveyor as claimed in claim 63; and a case presenting a compression chamber and a transmission chamber, said first and second compressors and said fluid flow control assembly being at least partially housed within said compression chamber, said compression chamber presenting a case inlet in fluid communication with the atmosphere.

66. In a pneumatic conveyor as claimed in claim 65, said fluid flow control assembly including a third additional passageway fluidly communicating the case inlet with said first inlet and fluidly communicating the case inlet with said second additional passageway, said fluid flow control assembly further including a fourth valve disposed along said third additional passageway for controlling the flow of air there through.

67. In a pneumatic conveyor as claimed in claim 66, said fourth valve shiftable between an open position wherein air is permitted to flow through said third additional passageway and a partially closed position wherein at least some air is prevented from flowing through said third additional passageway.

* * * * *